US 7,845,807 B2

(12) United States Patent
Iwasaki

(10) Patent No.: US 7,845,807 B2
(45) Date of Patent: Dec. 7, 2010

(54) PROJECTION APPARATUS AND THREE-DIMENSIONAL-SHAPE DETECTION APPARATUS

(75) Inventor: Takeo Iwasaki, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 975 days.

(21) Appl. No.: 11/535,457

(22) Filed: Sep. 26, 2006

(65) Prior Publication Data

US 2007/0019166 A1    Jan. 25, 2007

Related U.S. Application Data

(63) Continuation-in-part of application No. PCT/JP2005/005862, filed on Mar. 29, 2005.

(30) Foreign Application Priority Data

Mar. 31, 2004   (JP)   .............................. 2004-105427

(51) Int. Cl.
  *G03B 21/26*   (2006.01)
  *G03B 21/00*   (2006.01)
  *G09G 3/32*    (2006.01)
(52) U.S. Cl. ............................. 353/94; 353/122; 345/82
(58) Field of Classification Search ................... 353/94, 353/30–31, 34, 69–70, 122; 345/82–84, 345/211; 348/750–751; 359/291
See application file for complete search history.

(56) References Cited

U.S. PATENT DOCUMENTS 3,905,686 A * 9/1975 Ruben ........................ 359/716
6,462,891 B1 * 10/2002 Fukumoto et al. ........... 359/742
7,001,024 B2 * 2/2006 Kitaguchi et al. ............. 353/70
7,088,321 B1 * 8/2006 Parker ......................... 345/83
7,125,121 B2 * 10/2006 Miyagaki et al. ............. 353/31
7,131,735 B2 * 11/2006 Yokoyama ................... 353/98

(Continued)

FOREIGN PATENT DOCUMENTS

JP          60152903 A        8/1985

(Continued)

OTHER PUBLICATIONS

Japanese Patent Office, Notification of Reasons for Rejection in counterpart Patent Application No. JP 2004-105427 mailed Jun. 22, 2010.

*Primary Examiner*—Georgia Y Epps
*Assistant Examiner*—Jori S Reilly-Diakun
(74) *Attorney, Agent, or Firm*—Baker Botts, LLP

(57) ABSTRACT

A projection apparatus, which is provided with a plurality of semiconductor light-emitting elements for emitting light, a spatial modulation element that performs spatial modulation of light emitted from the semiconductor light-emitting element and outputting image signal light, and a projection unit that projects the image signal light output from the spatial modulation element onto a projection plane. In this configuration, the plurality of semiconductor light-emitting elements is arranged on a substrate supporting the semiconductor light-emitting elements, in one or more parallel rows of semiconductor light-emitting elements, each including two or more semiconductor elements arranged in a straight line in a first direction at a first pitch, and the first pitch is smaller than or equal to the fall width at half maximum of an illumination distribution of light emitted from one of the semiconductor light-emitting elements, formed by the spatial modulation element.

23 Claims, 25 Drawing Sheets

U.S. PATENT DOCUMENTS

| | | | |
|---|---|---|---|
| 7,207,677 B2 * | 4/2007 | Takeda et al. | 353/31 |
| 7,396,136 B2 * | 7/2008 | Kim et al. | 353/94 |
| 7,459,333 B2 * | 12/2008 | Richards et al. | 438/66 |
| 7,498,648 B2 * | 3/2009 | Richards et al. | 257/436 |
| 7,553,033 B2 * | 6/2009 | Seki | 353/85 |
| 7,636,190 B2 * | 12/2009 | Huibers | 359/291 |
| 2003/0222980 A1 * | 12/2003 | Miyagaki et al. | 348/115 |
| 2004/0141160 A1 * | 7/2004 | Yoneyama | 353/98 |

FOREIGN PATENT DOCUMENTS

| | | |
|---|---|---|
| JP | S60-152903 A | 8/1985 |
| JP | 63155782 A | 6/1988 |
| JP | S63-155782 A | 6/1988 |
| JP | 01296764 A | 11/1989 |
| JP | 11032278 A | 2/1999 |
| JP | 11231316 A | 8/1999 |
| JP | 2002303988 A | 10/2002 |
| JP | 2004-095655 A | 3/2004 |
| JP | 2004095655 A | 3/2004 |
| WO | 02/080136 A1 | 10/2002 |
| WO | 2005095887 A1 | 10/2005 |

* cited by examiner (a)

(b) (c)

(a)

(a)

(b)

(a)

(b)               (c)

(a)

(b)

(a)

(b)

PROJECTION APPARATUS AND THREE-DIMENSIONAL-SHAPE DETECTION APPARATUS

BACKGROUND

1. Technical Field

The present invention relates to projection apparatuses and three-dimensional-shape detection apparatuses which can project a high-quality image onto a projection plane, suppressing variations in illumination of light applied from a semiconductor light-emitting element to a spatial modulation element.

2. Related Art

A previously known projection apparatus is configured to project a desired image onto a projection plane by performing spatial modulation of light coming from a Light source by means of a spatial modulation element. To be more detailed, this type of projection apparatus collects light coming from the light source by a light-collecting optical system, performs spatial modulation of collected light by means of the spatial modulation element in accordance with an image signal, and projects spatial-modulated light as image signal light onto the projection plane through a projection means.

The light source of the projection apparatus is used to be a xenon lamp, a halogen lamp, a metal halide lamp, or the like. Although this type of light source lasts short, it must be kept continuously on in the projection apparatus because on-off modulation cannot be performed. Accordingly, the conventional projection apparatus consumes much power.

Technologies disclosed in Japanese Patent Provisional Publication No. 11-32278 (hereafter referred to as document 1) and Japanese Patent Provisional Publication No. 11-231316 (hereafter referred to as document 2) solve the problem by using a semiconductor light-emitting element, or more specifically, a light-emitting diode (LED) as a light source of the projection apparatus.

The LED light source of the projection apparatus lasts longer and consumes less power. The light output from the LED has a strong directivity. Because the light-emitting area is small, the light collection efficiency is improved, consequently improving the light use efficiency.

SUMMARY

Even if the projection apparatus uses a LED light source, light may not be emitted almost evenly to the spatial modulation element, depending on the arrangement or position of the LED, Accordingly, variations in illumination will degrade the quality of the image projected onto the projection plane.

The present invention has been made to solve the problems. An object of the present invention is to provide a projection apparatus and a three-dimensional-shape detection apparatus that can project a high-quality image onto a projection plane, suppressing variations in illumination of light emitted from a semiconductor light-emitting element to a spatial modulation element.

A projection apparatus provided to accomplish the above-described object from one aspect of the present invention includes a plurality of semiconductor light-emitting elements for emitting light, a spatial modulation element that performs spatial modulation of light emitted from the semiconductor light-emitting element and outputs image signal light, and a projection unit that projects the image signal light output from the spatial modulation element onto a projection plane. In this configuration, the plurality of semiconductor light-emitting elements is arranged on a substrate supporting the plurality of semiconductor light-emitting elements, in one or more parallel rows of semiconductor light-emitting elements, each including two or more semiconductor elements in a straight line in a first direction at a first pitch, and the first pitch is smaller than or equal to the full width at half maximum of an illumination distribution of light emitted from one of the semiconductor light-emitting elements, formed by the spatial modulation element.

In this configuration, in the row of semiconductor light-emitting elements having two or more semiconductor elements arranged in a straight line with almost identical first pitches, the first pitch is smaller than or equal to the full width at half maximum of the illumination distribution of light emitted from one of the semiconductor light-emitting elements, formed by the spatial modulation element. Accordingly, reductions in illumination among adjacent semiconductor light-emitting elements can be suppressed. Therefore, variations in illumination at the spatial modulation element can be suppressed, and almost even light can be applied to the spatial modulation element. Consequently, a high-quality image can be projected onto the projection plane.

A projection apparatus provided from another aspect of the present invention includes a plurality of semiconductor light-emitting elements for emitting light, a spatial modulation element for performing spatial modulation of light emitted from the semiconductor light-emitting elements and outputting image signal light, and a projection unit that projects the image signal light output from the spatial modulation element to a projection plane. In this configuration, the plurality of semiconductor light-emitting elements are arranged in a staggered manner on the substrate supporting the plurality of semiconductor light-emitting elements.

In this configuration, the plurality of semiconductor light-emitting elements is arranged in a staggered manner on the substrate supporting the plurality of semiconductor light-emitting elements, so that illumination lowered between adjacent semiconductor light-emitting elements can be made up by a semiconductor light-emitting element in a forward or backward row. Accordingly, variations in illumination at the spatial modulation element can be suppressed. Consequently, almost even light can be applied to the spatial modulation element, and a high-quality projection image can be projected.

A three-dimensional-shape detection apparatus provided from a further aspect of the present invention includes a projection apparatus configured as described above, an imaging unit that takes an image of an object disposed in the projection direction in which the image signal light output from the projection unit in the projection apparatus is projected, while the image signal light is projected from the projection unit onto the object as pattern light, and a three-dimensional-shape detection unit that detects the three-dimensional shape of the object in accordance the image taken by the imaging unit.

With the three-dimensional-shape detection apparatus, almost even light can be applied to the spatial modulation element, and the three-dimensional shape can be detected with high precision by projecting a high-quality projection image.

BRIEF DESCRIPTION OF THE ACCOMPANYING DRAWINGS

Figure 4:
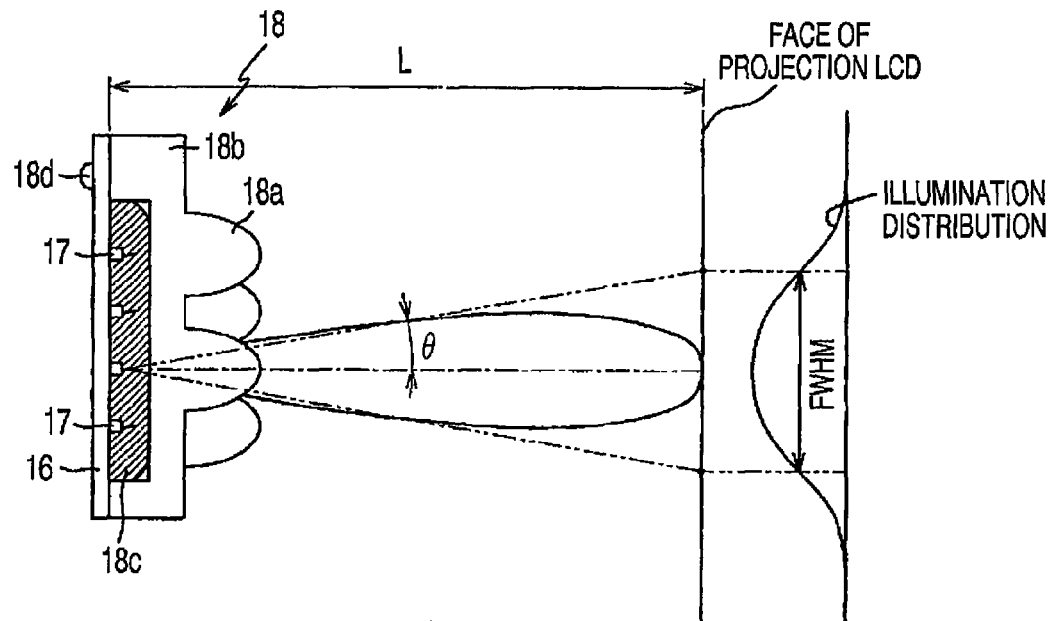
Figure 4:
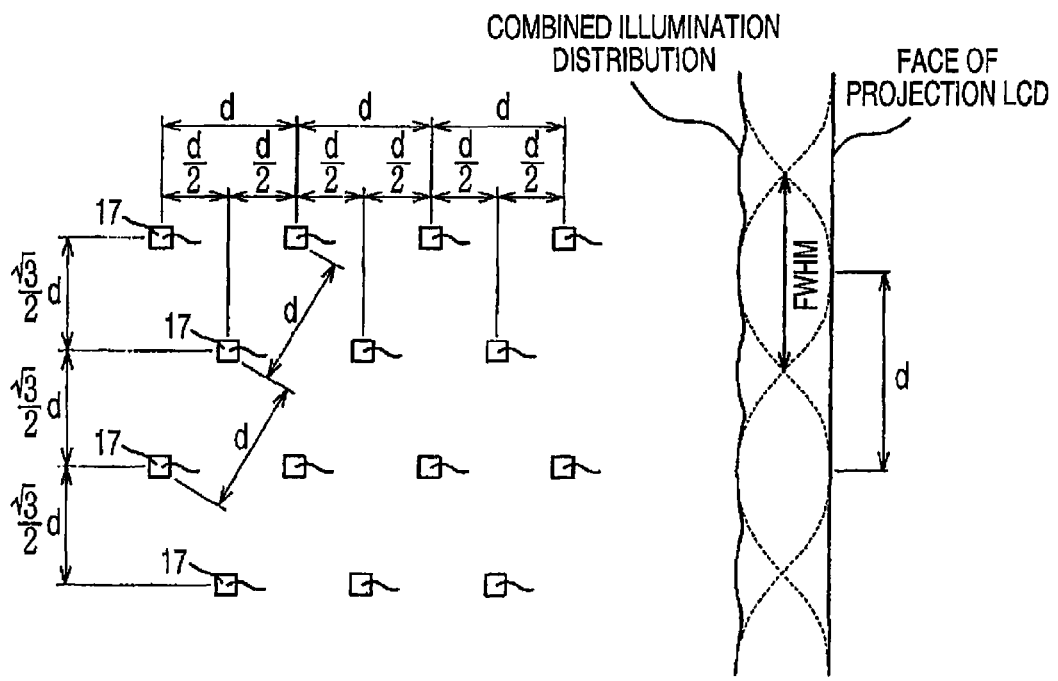

FIGS. 4(a) to 4(c) are views illustrating an arrangement in an LED array.

Figure 5:
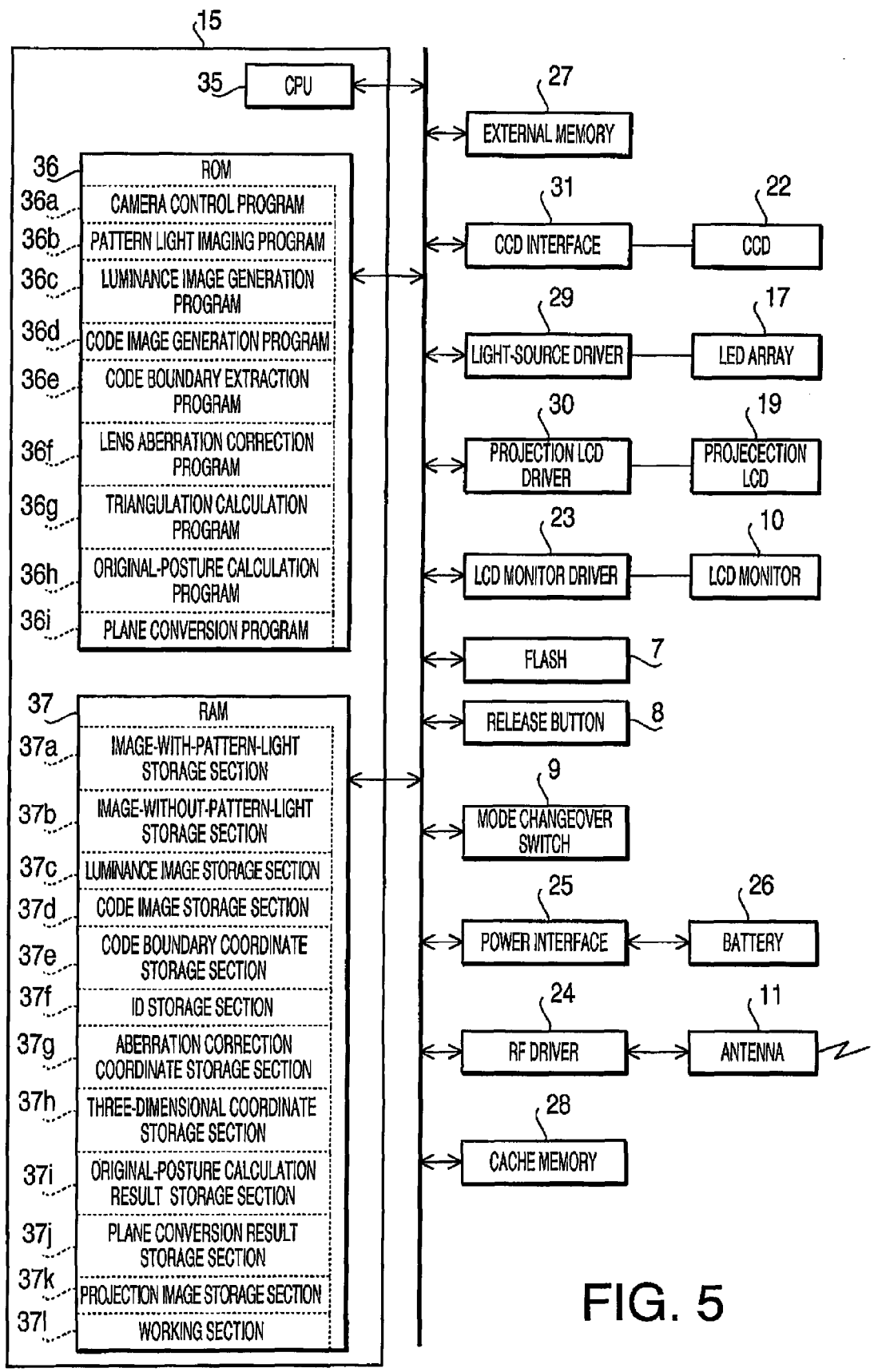

FIG. 5 is a block diagram showing an electric configuration of the image input-and-output apparatus.

Figure 6:
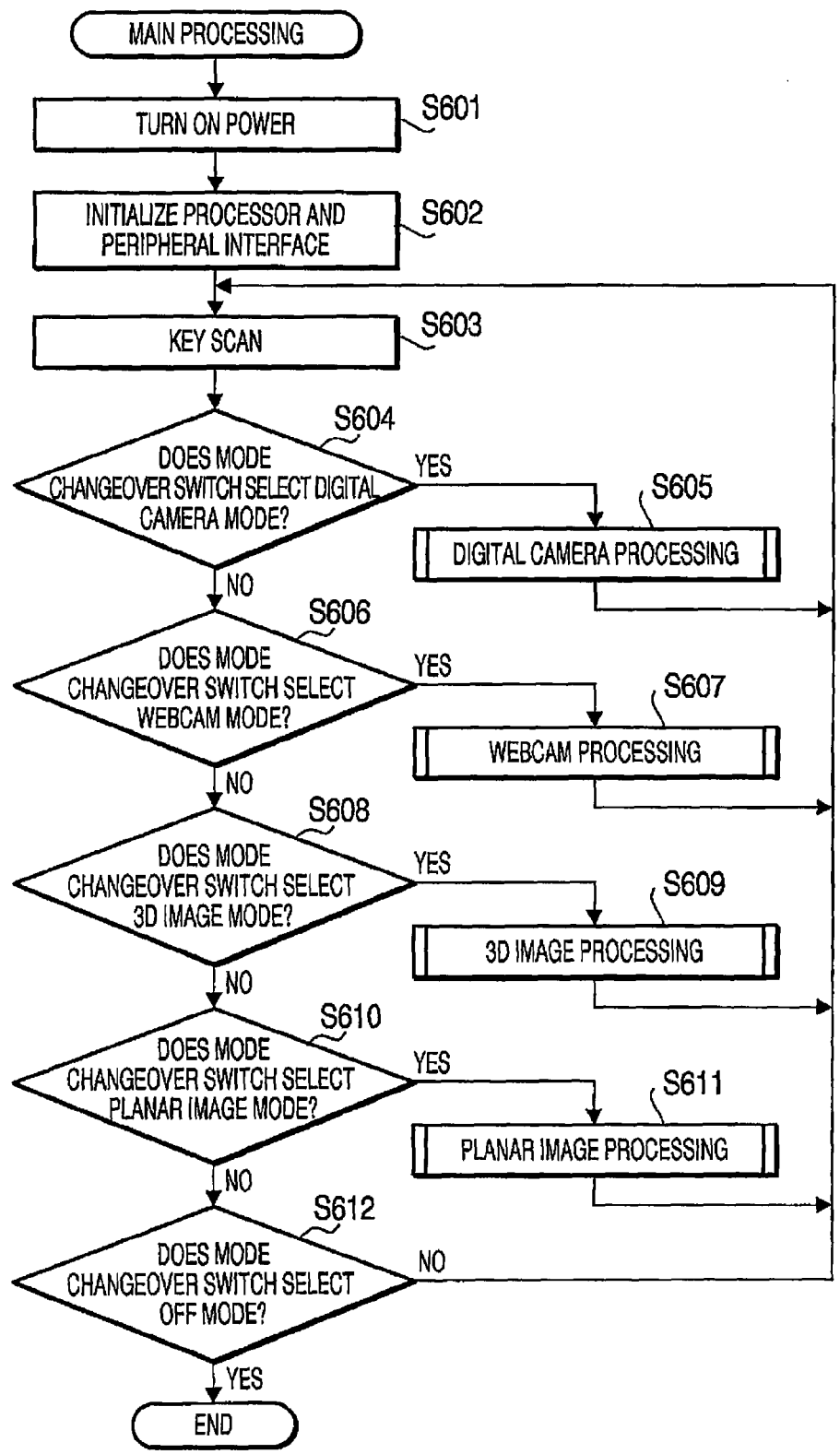

FIG. 6 is a flow chart of main processing.

Figure 7:
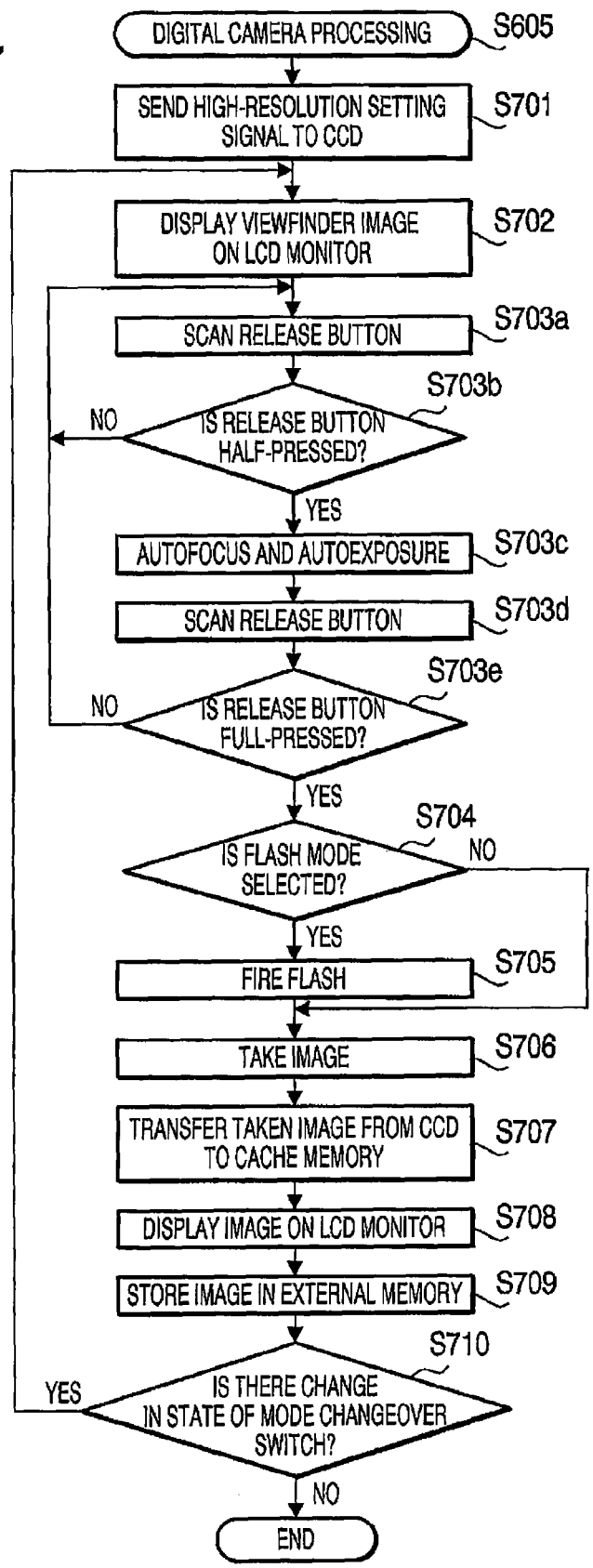

FIG. 7 is a flow chart of digital camera processing.

Figure 8:
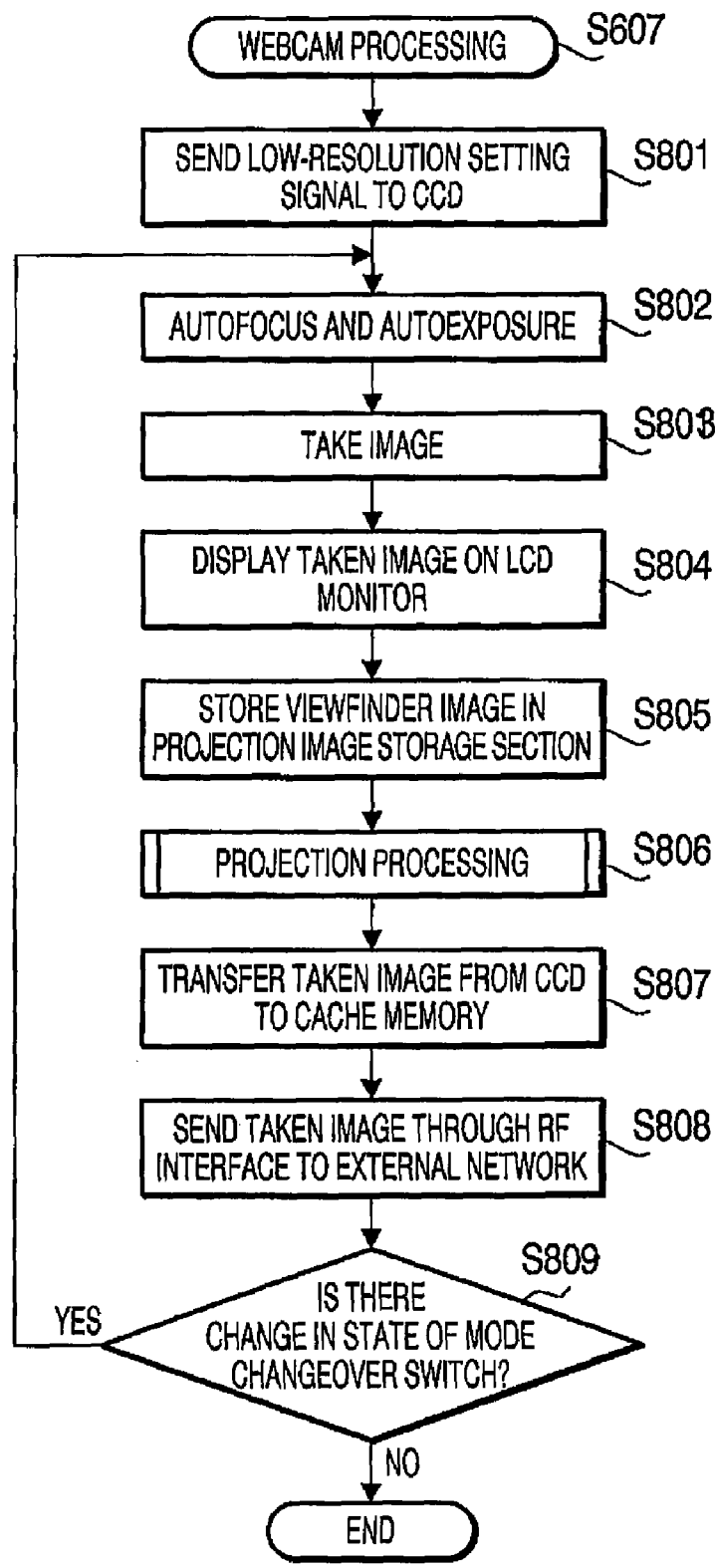

FIG. 8 is a flow chart of webcam processing.

Figure 9:
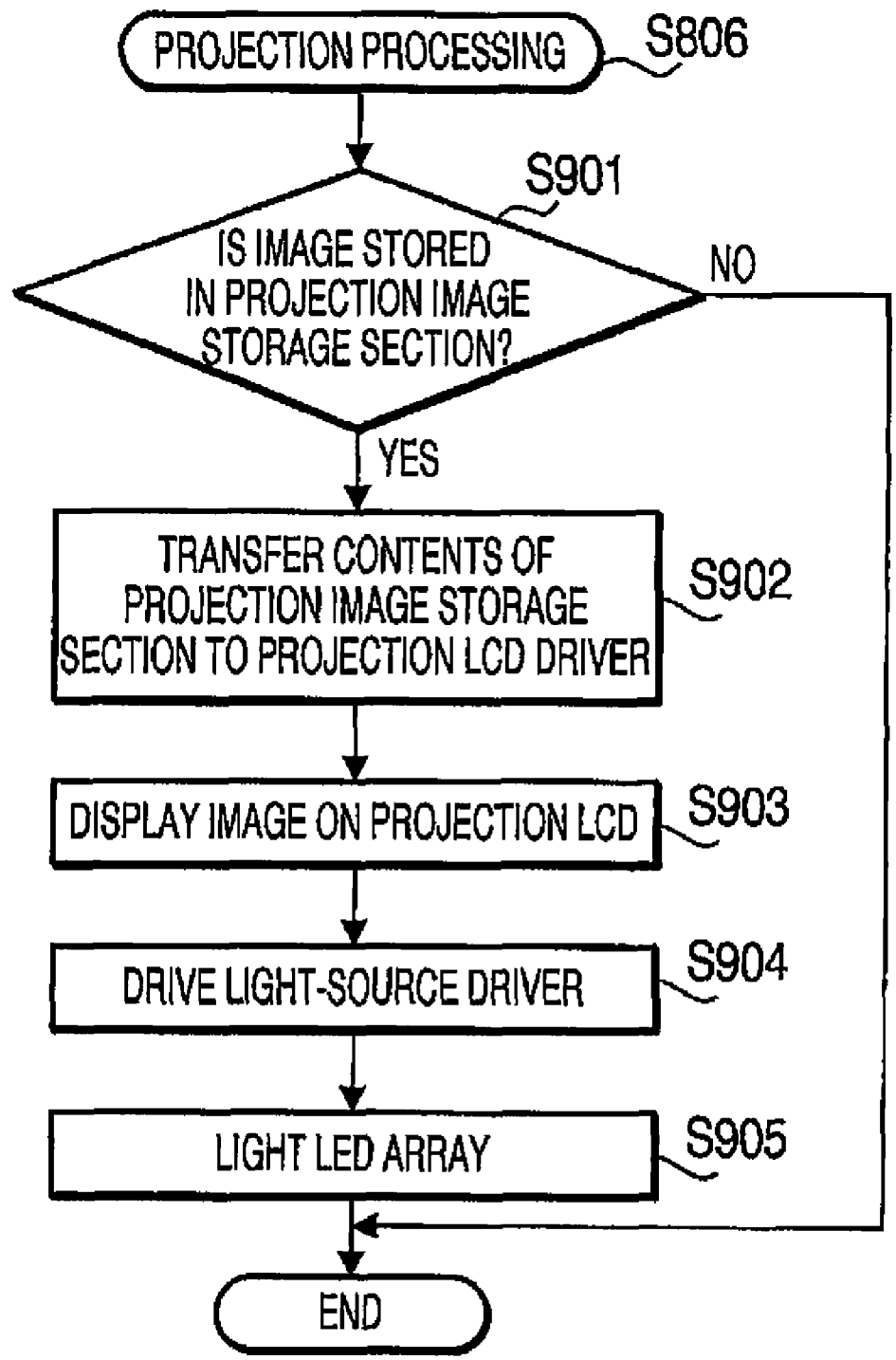

FIG. 9 is a flow chart of projection processing.

Figure 10:
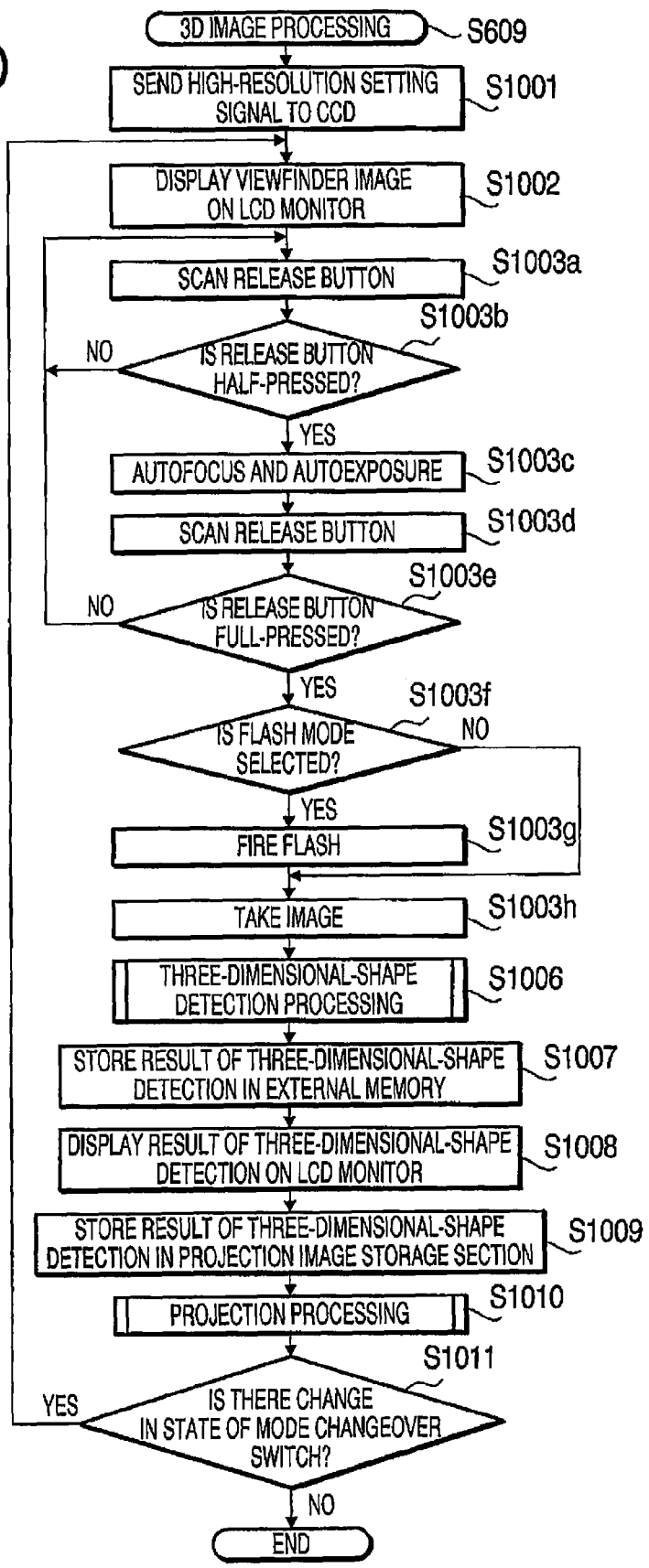

FIG. 10 is a flow chart of 3D image processing.

Figure 11:
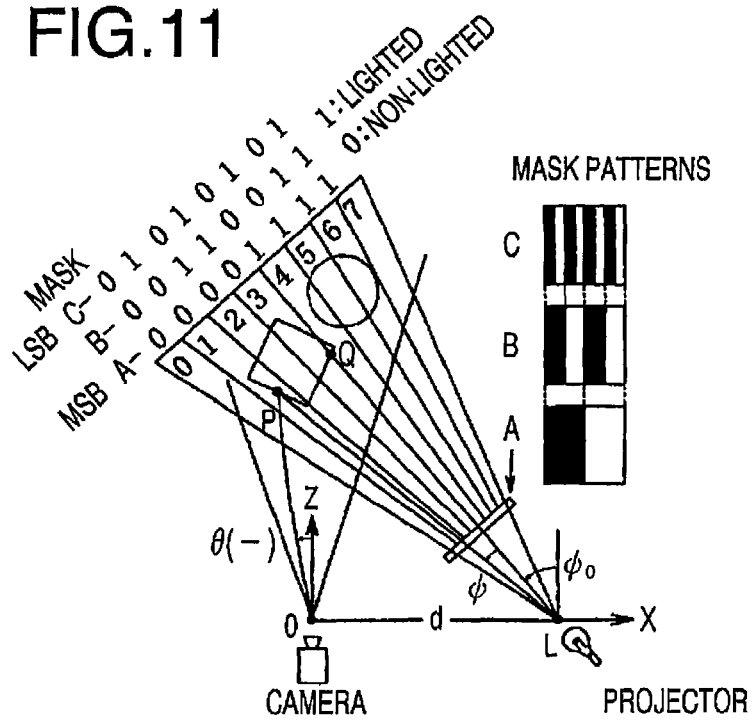
Figure 11:
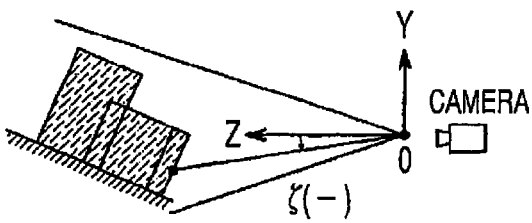
Figure 11:
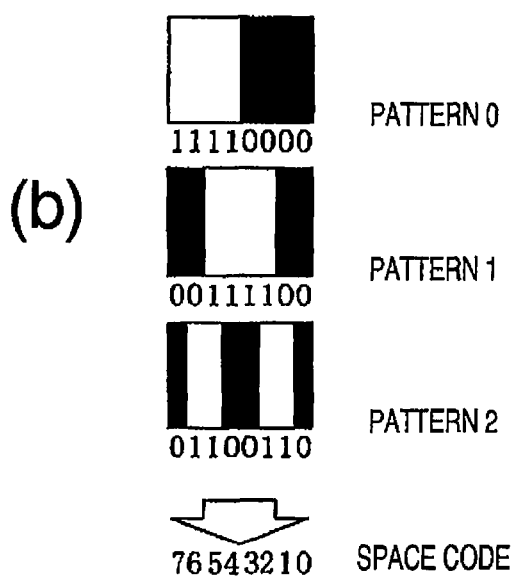

FIG. 11(a) is a view illustrating the principle of the space code method, and FIG. 11(b) is a view showing mask patterns (gray code) different from those shown in FIG. 11(a).

FIG. 12(a) is a flow chart of three-dimensional-shape detection processing. FIG. 12(b) is a flow chart of imaging processing. FIG. 12(c) is a flow chart of three-dimensional measurement processing.

Figure 13:
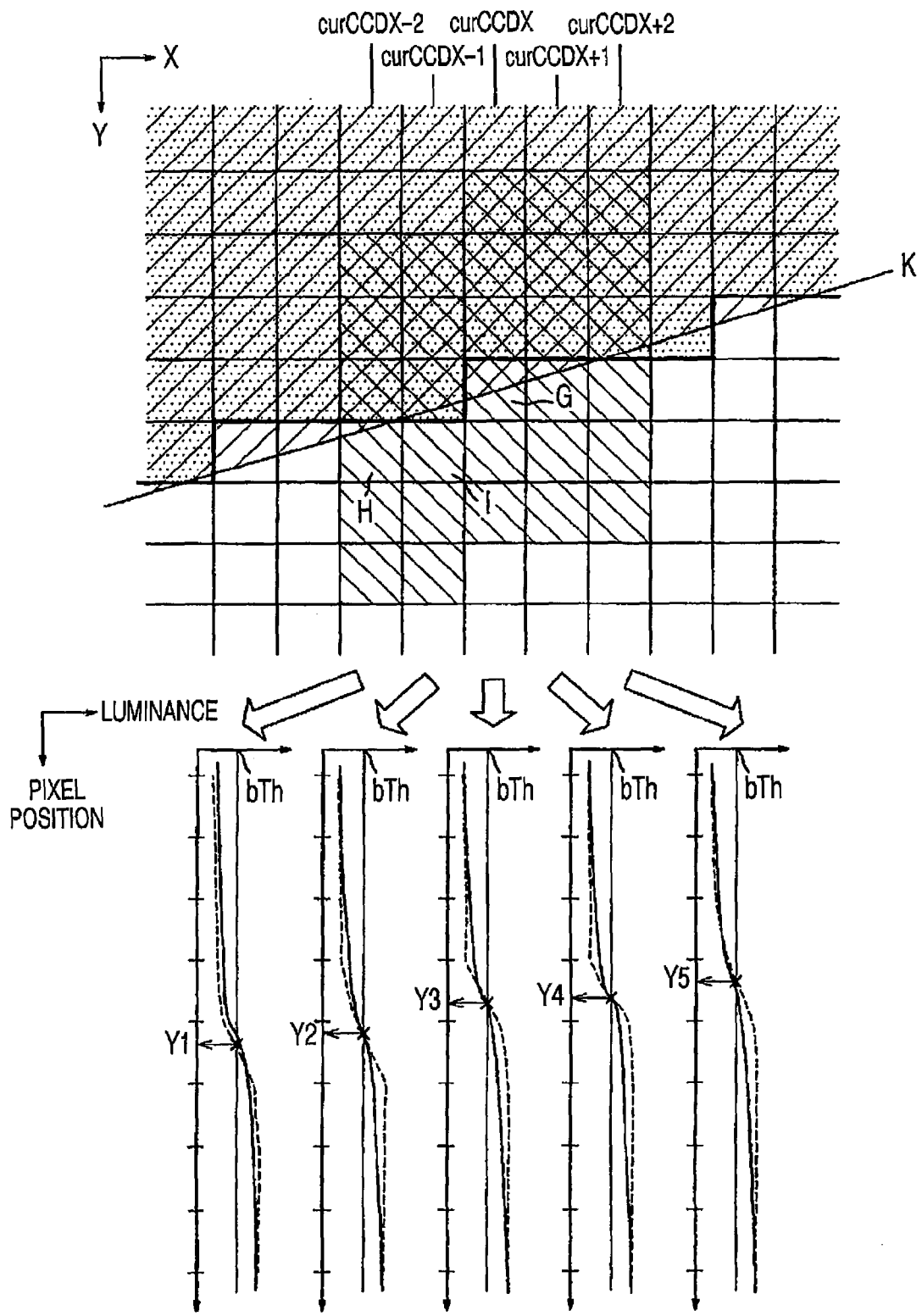

FIG. 13 is a view illustrating an overview of code boundary coordinate detection processing.

Figure 14:
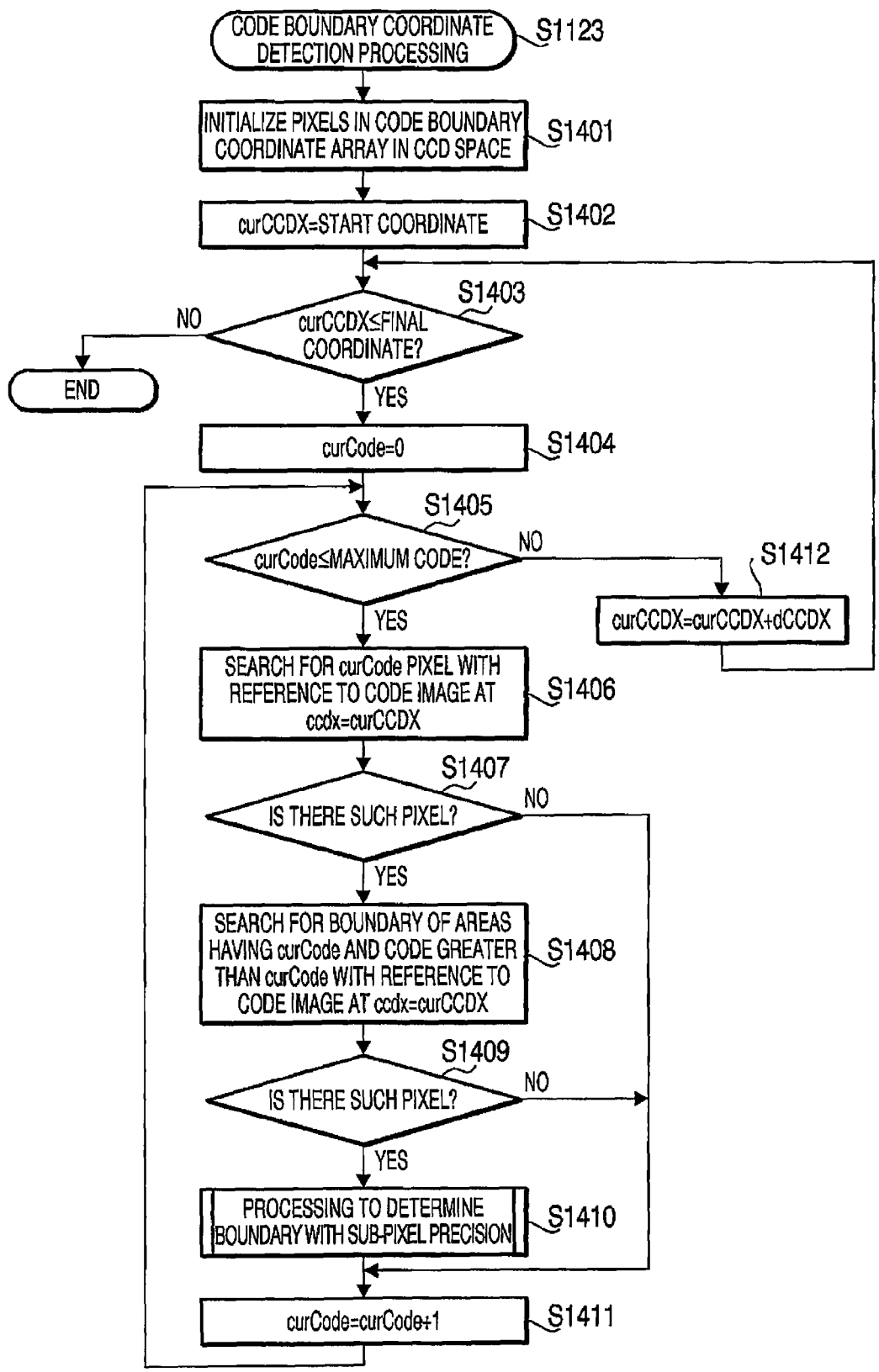

FIG. 14 is a flow chart of the code boundary coordinate detection processing.

Figure 15:
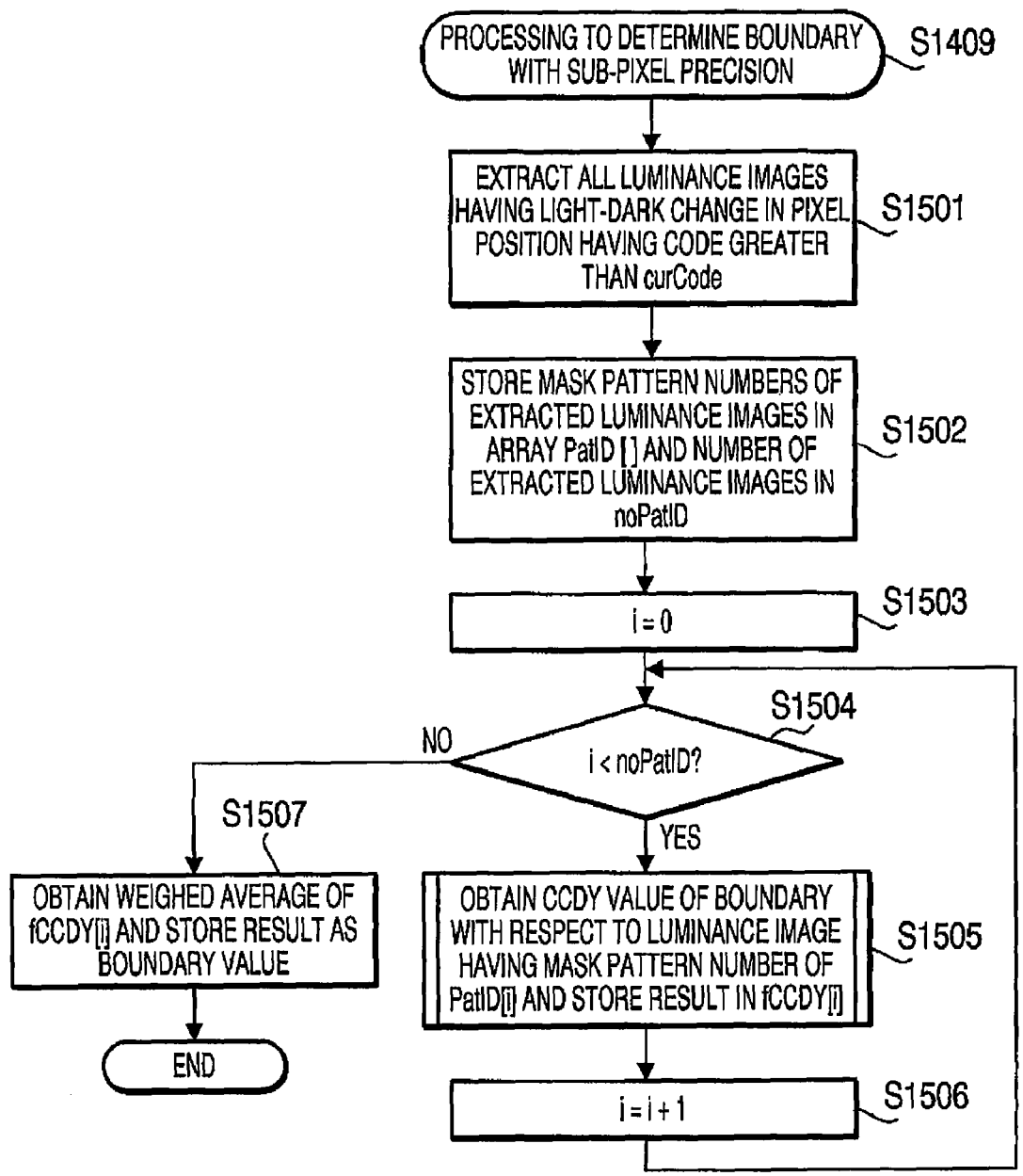

FIG. 15 is a flow chart of processing for obtaining a code boundary coordinate with sub-pixel precision.

Figure 16:
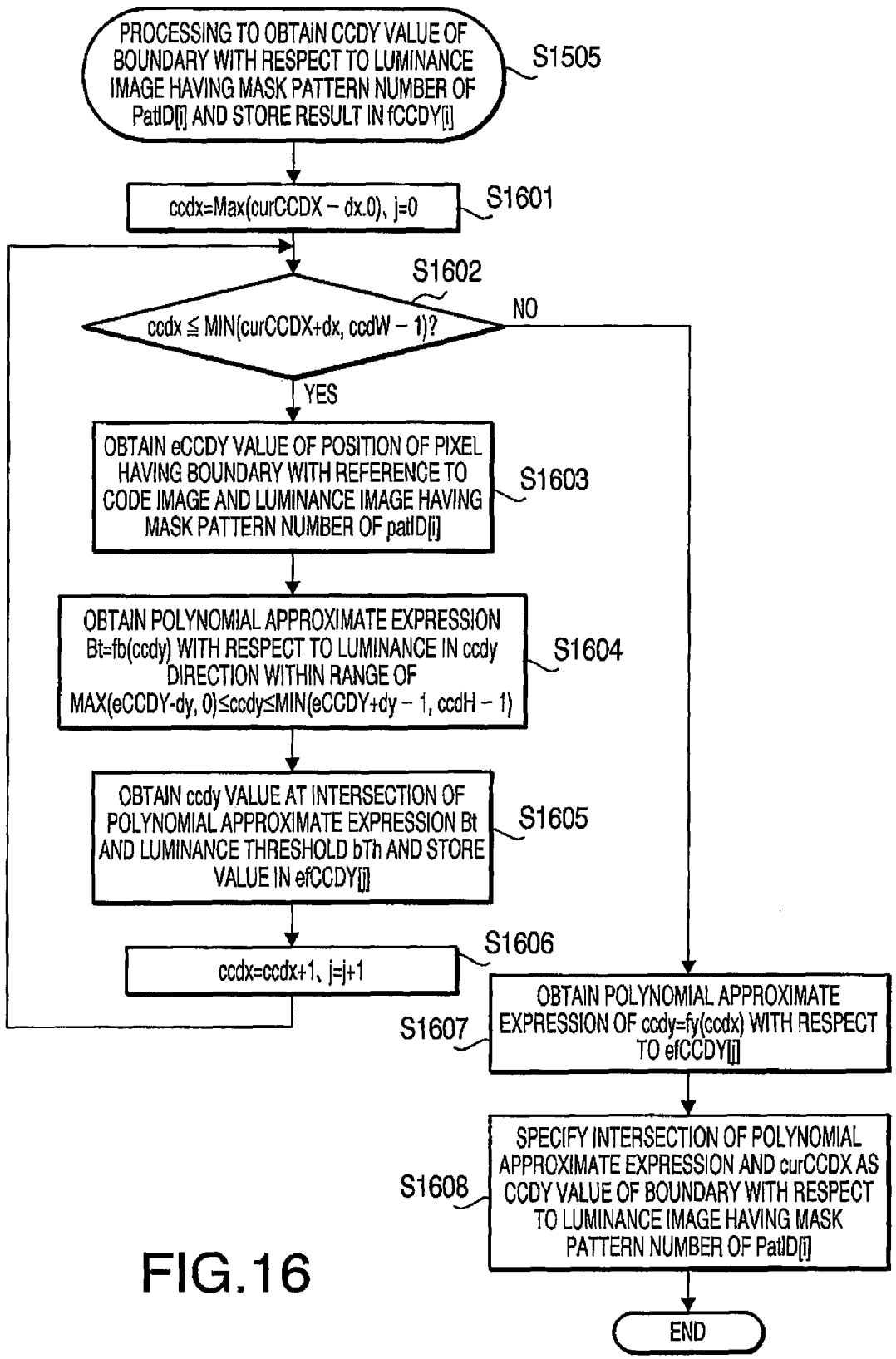

FIG. 16 is a flow chart of processing for obtaining the CCDY value of the boundary with respect to a luminance image having a mask pattern number of PatID[i].

Figure 17:
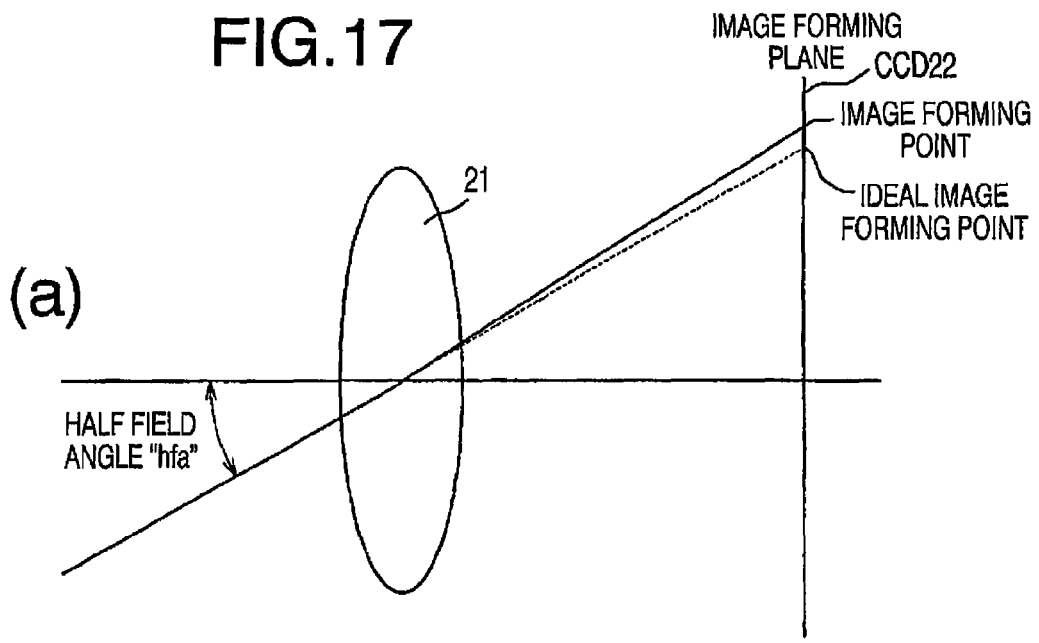
Figure 17:
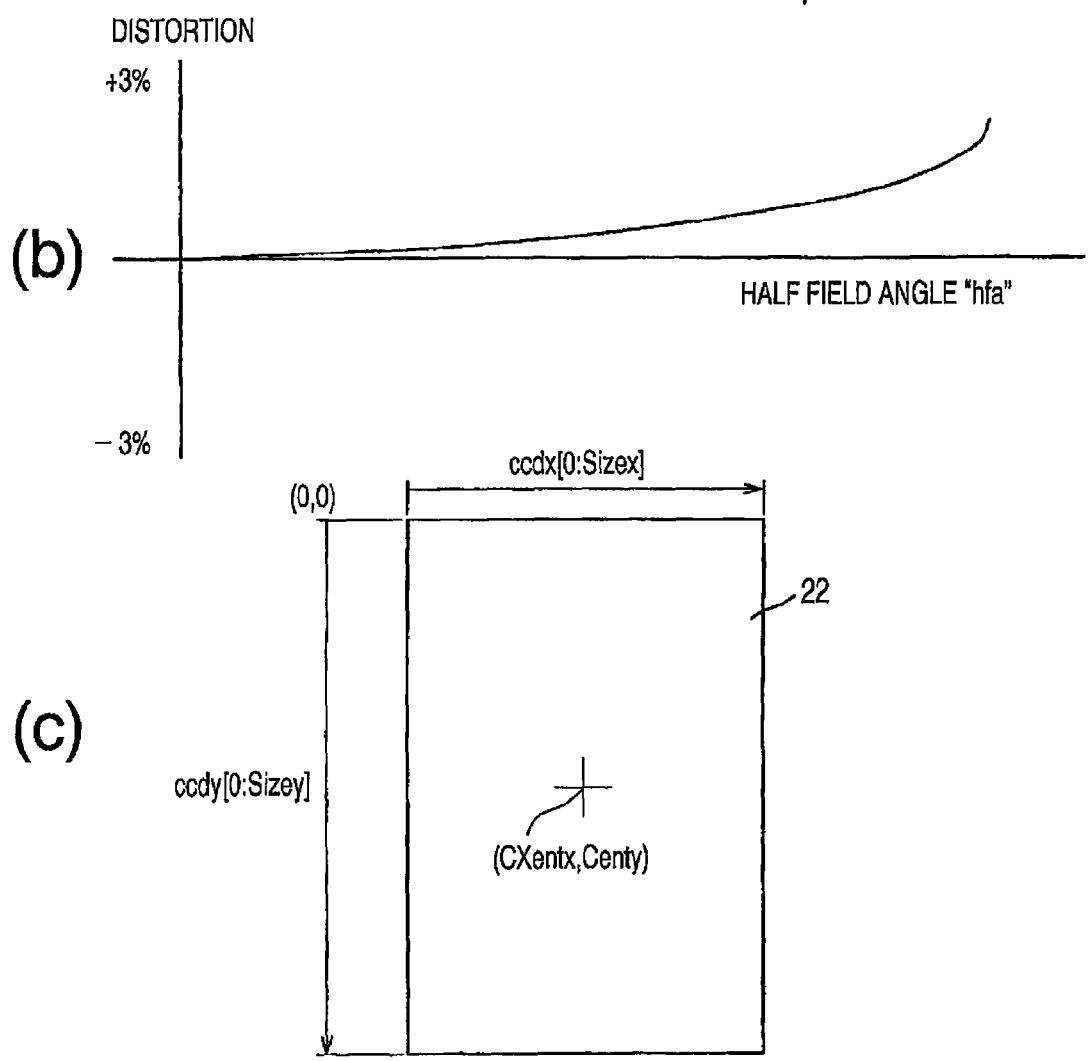

FIGS. 17(a) to 17(c) are views illustrating lens aberration correction processing.

Figure 18:
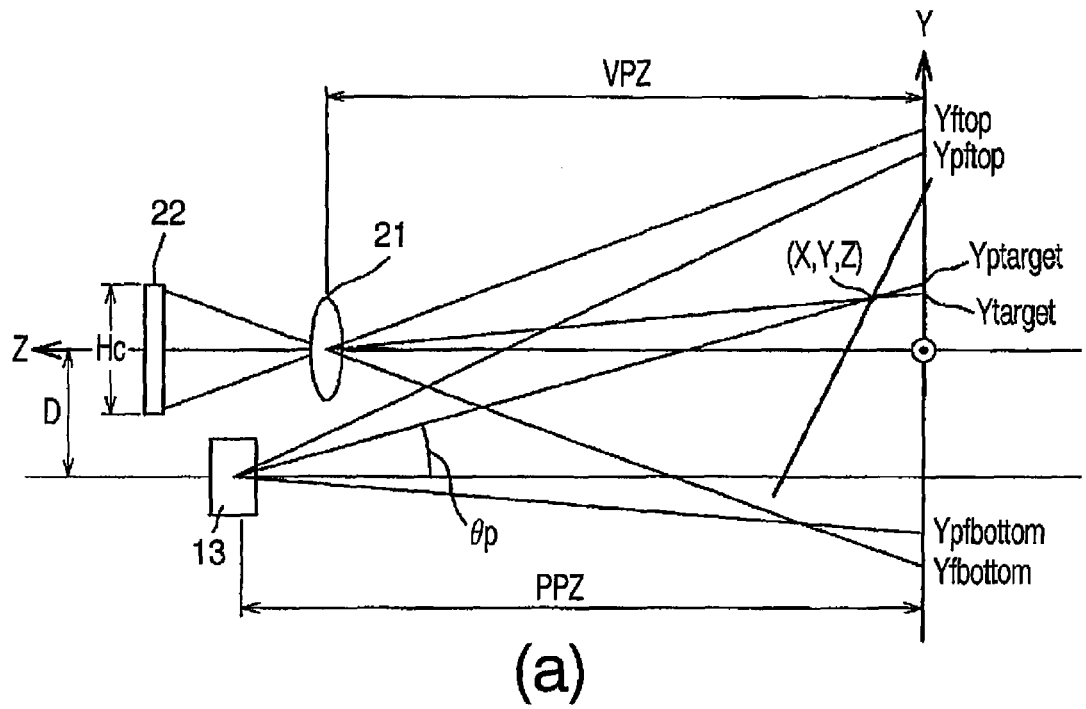
Figure 18:
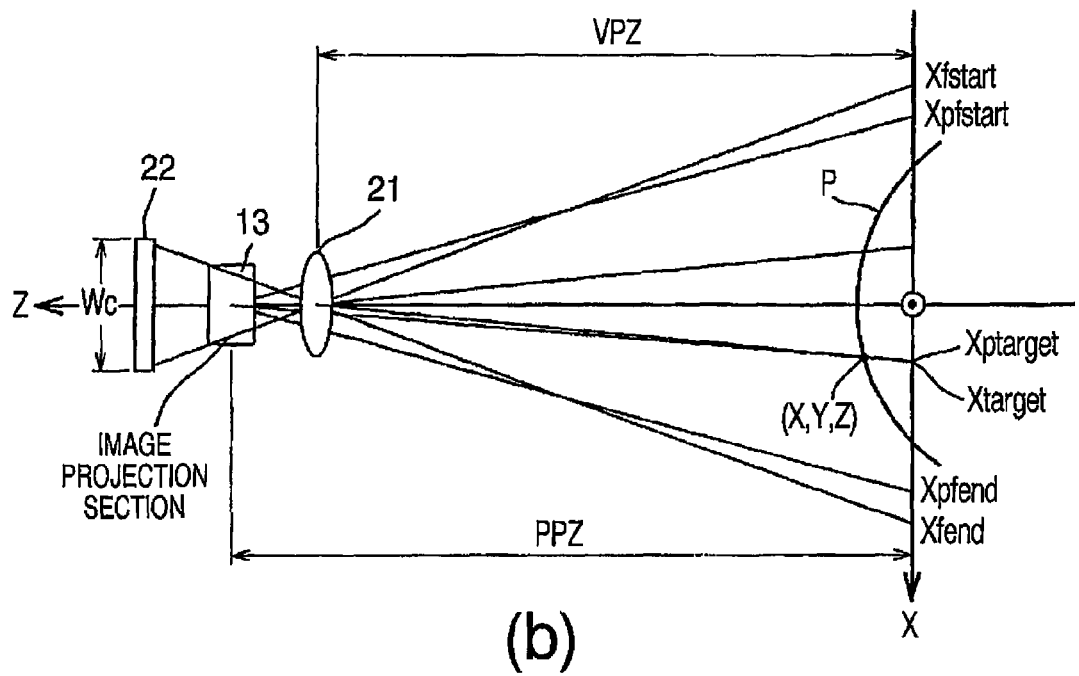

FIGS. 18(a) and 18(b) are views illustrating a method of calculating three-dimensional coordinates in a three-dimensional space from coordinates in the CCD space.

Figure 19:
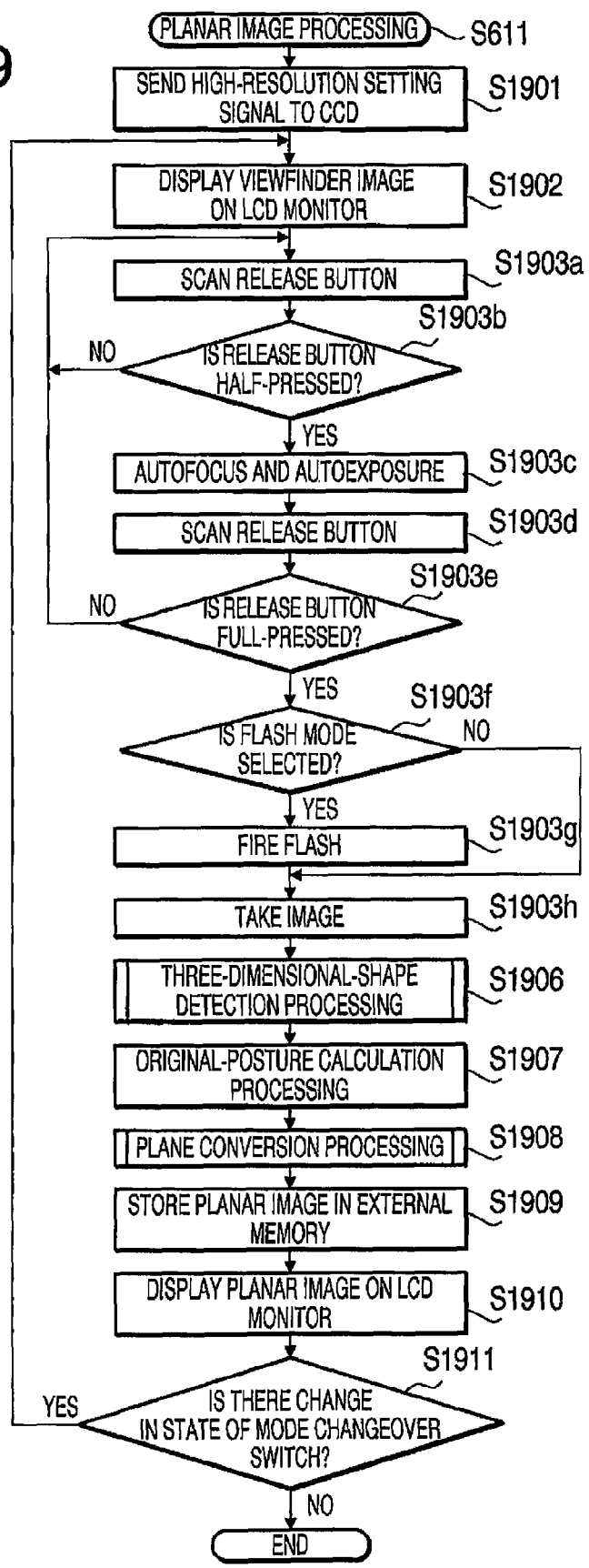

FIG. 19 is a flow chart of planar image processing.

FIGS. 20(a) to 20(c) are views illustrating original-posture calculation processing.

Figure 21:
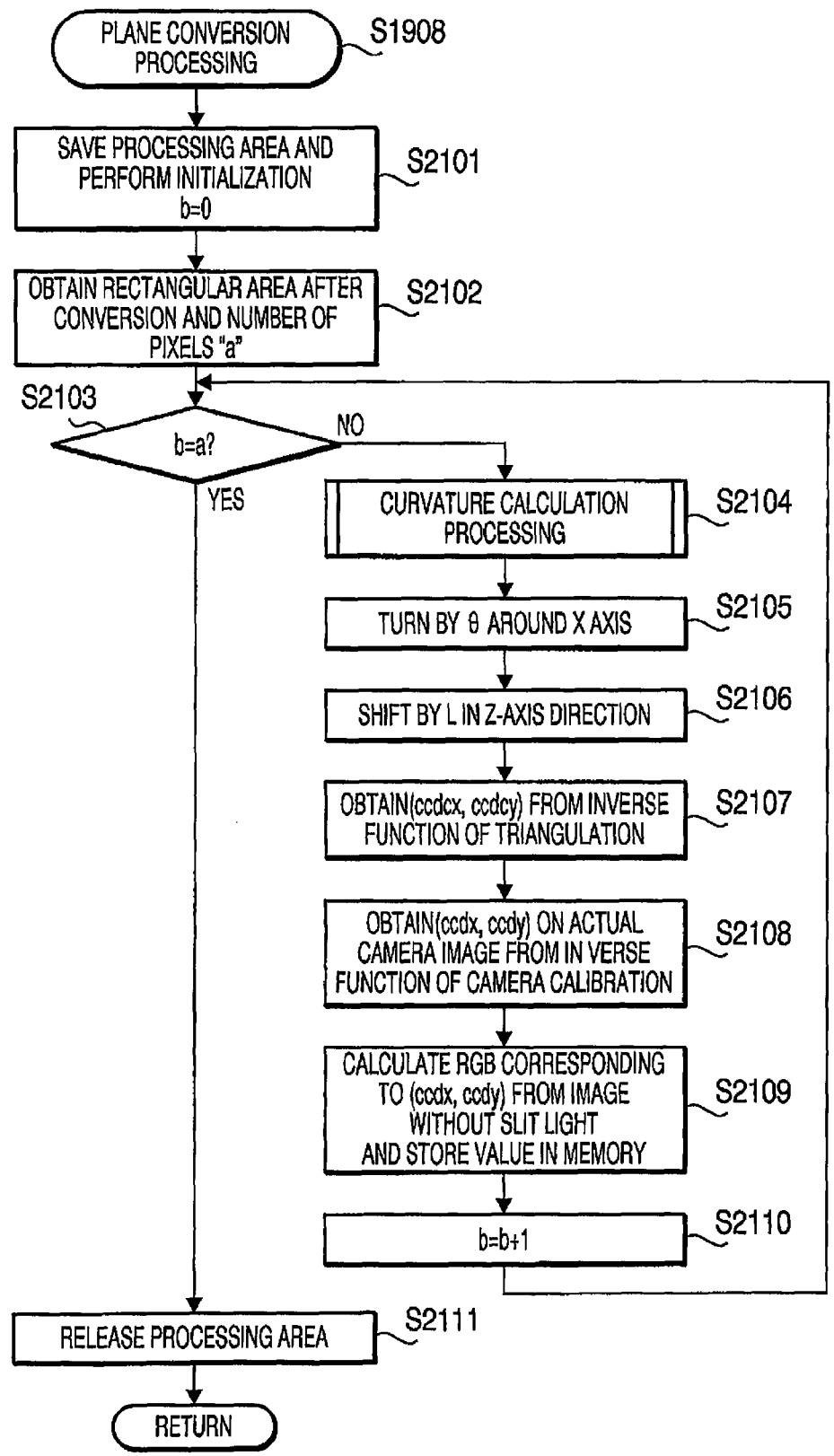

FIG. 21 is a flow chart of plane conversion processing.

FIG. 22(a) is a view illustrating an overview of curvature calculation processing, and FIG. 22(b) is a view illustrating a planar image formed by the plane conversion processing.

Figure 23:
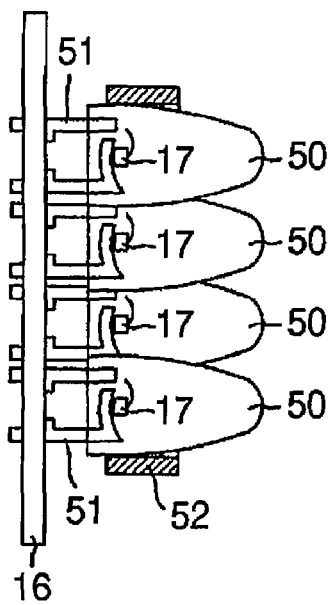
Figure 23:
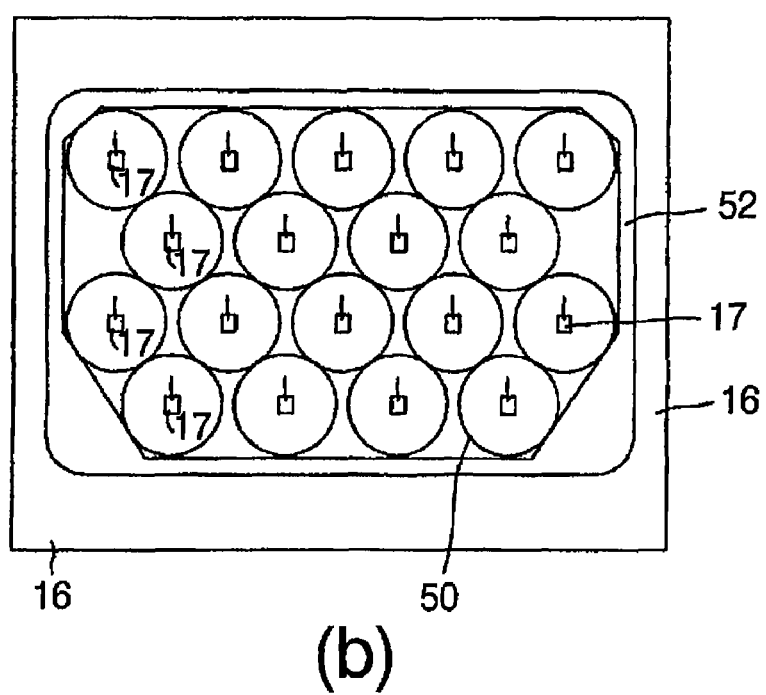

FIG. 23(a) is a side view showing another example of light-source lenses, and FIG. 23(b) is a plan view showing the light-source lenses shown in FIG. 23(a).

Figure 24:
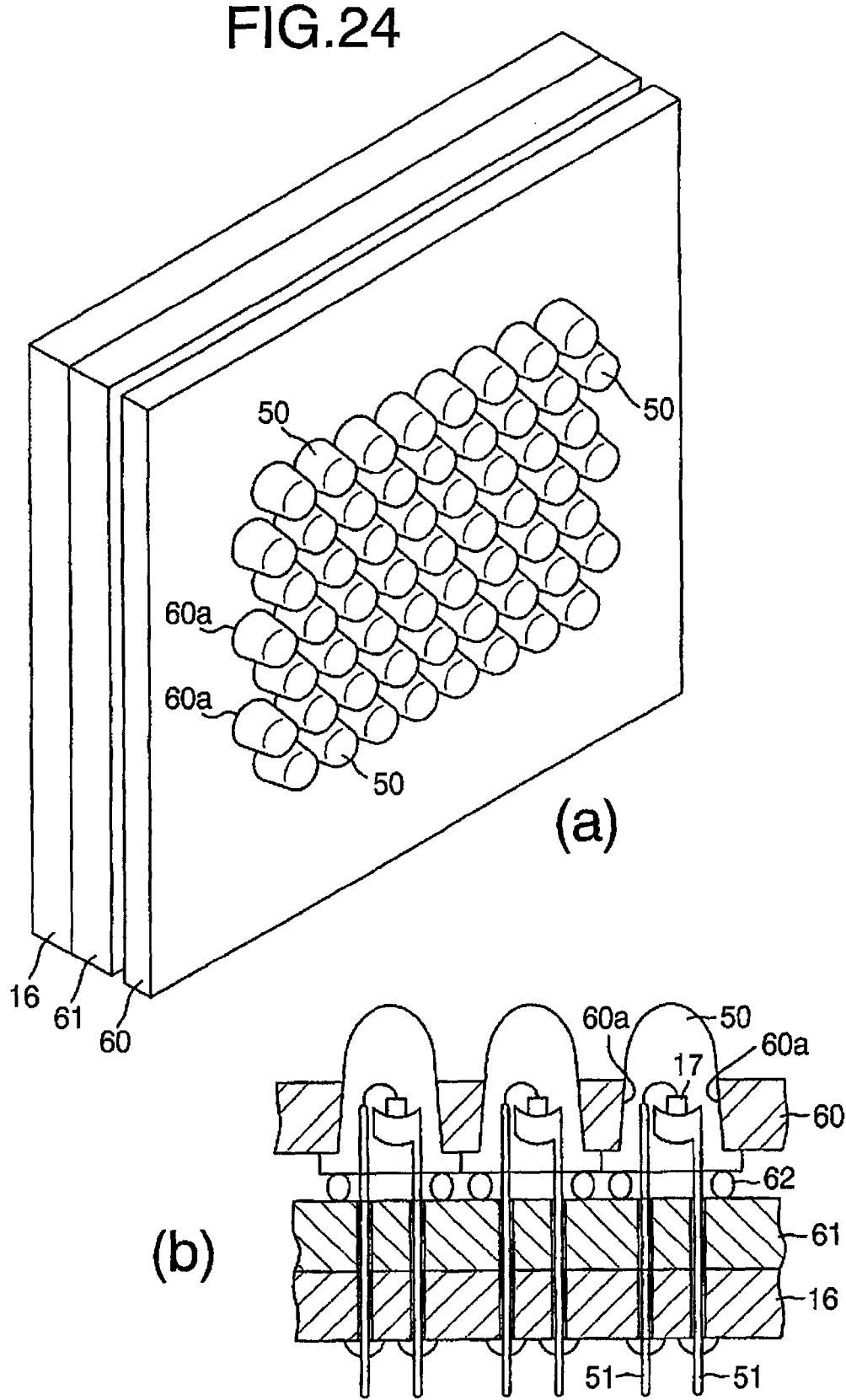

FIG. 24(a) is a perspective view showing a fixed state of the light-source lenses, and FIG. 24(b) is a partial section view of the state.

Figure 25:
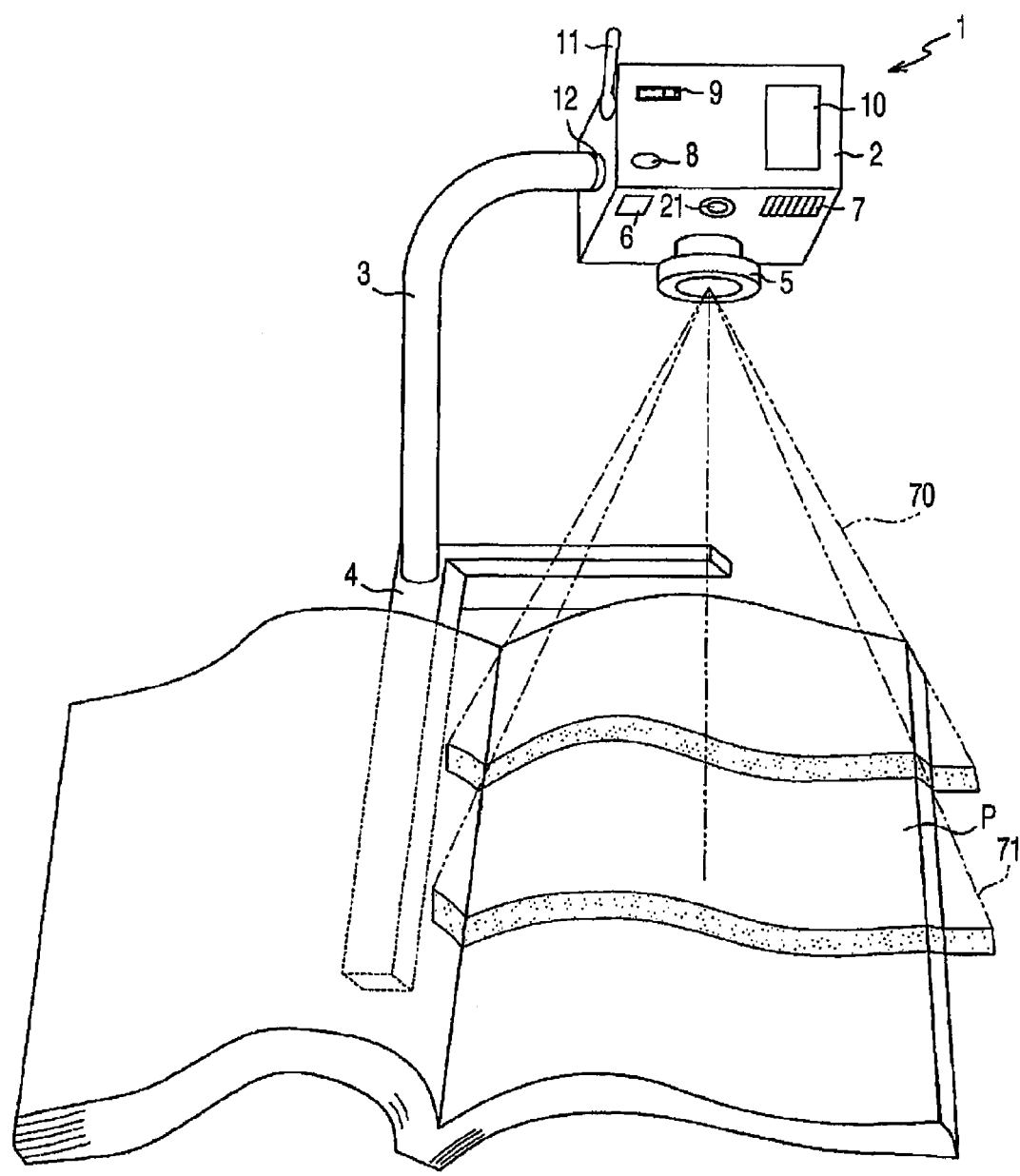

FIG. 25 is a view showing another example of pattern light projected to the object.

DETAILED DESCRIPTION

Figure 1:
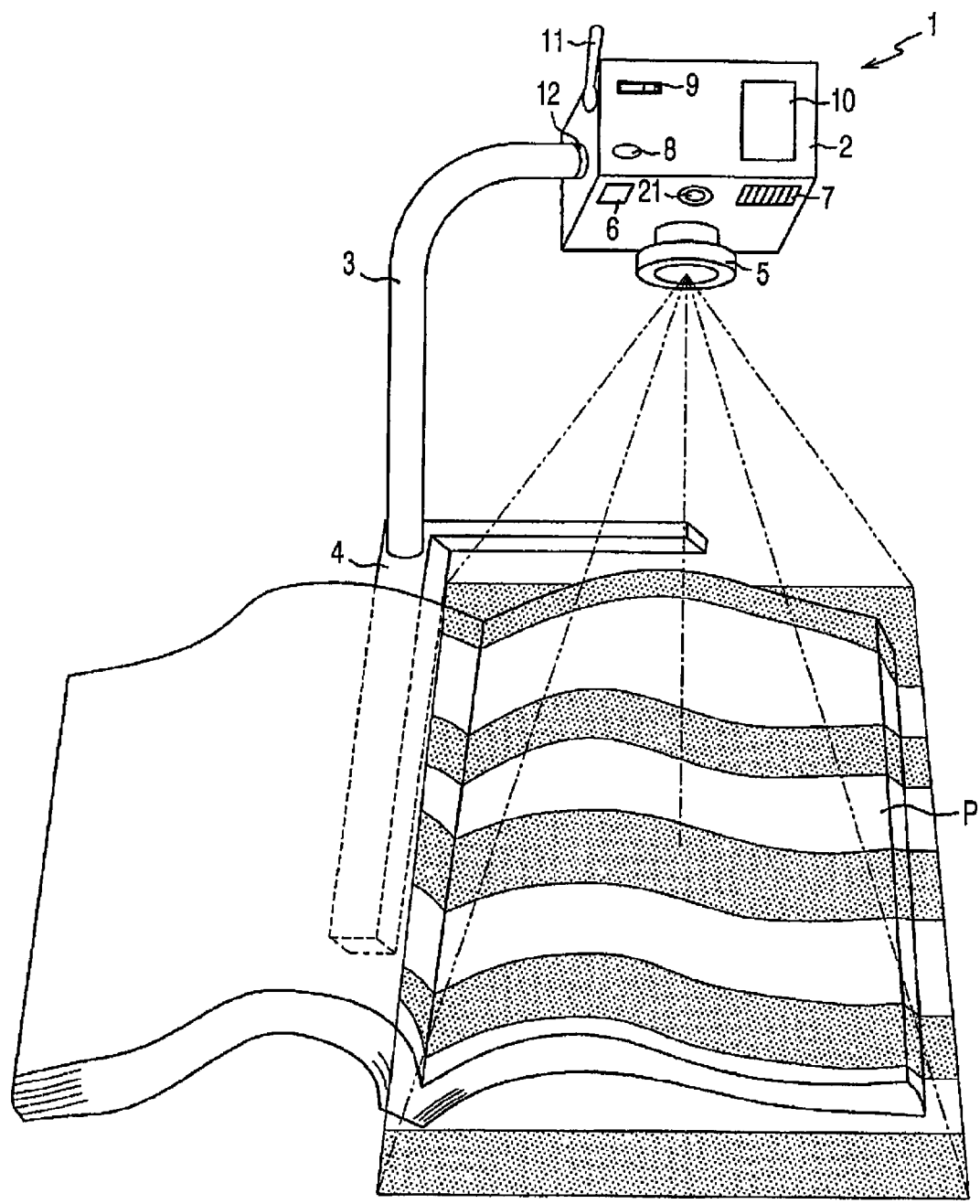
FIG. 1 is an external perspective view of an image input-and-output apparatus.

A preferred embodiment of the present invention will be described below with reference to the drawings. FIG. 1 is an external perspective view of an image input-and-output apparatus 1. The image input-and-output apparatus 1 includes a projection apparatus and a three-dimensional-shape detection apparatus according to the embodiment of the present invention.

The image input-and-output apparatus 1 has a variety of modes such as a digital camera mode for implementing a digital camera function, a webcam mode for implementing a web camera function, a 3D image mode for obtaining a 3D image by detecting a three-dimensional shape, a planar image mode for obtaining a planar image of a curved original, and the like.

FIG. 1 shows that an image projection section 13, which will be described later, projects a striped pattern light including a series of alternate light and dark patterns for three-dimensional-shape detection of original P serving as an object in the 3D image mode or the planar image mode.

The image input-and-output apparatus 1 includes an imaging head 2 shaped like a box, an arm member 3 shaped like a pipe, with one end connected to the imaging head 2, and a base 4 shaped like a letter L in a plan view, connected to the other end of the arm member 3.

The imaging head 2 is a case containing the image projection section 13 and an image pickup section 14, which will be described later. A cylindrical lens barrel 5 is disposed at the center in front of the imaging head 2. A viewfinder 6 is disposed diagonally above the lens barrel 5. A flash 7 is disposed in an opposite corner of the viewfinder 6. A part of a lens of an imaging optical system 21 of the image pickup section 14, described later, is exposed between the viewfinder 6 and the flash 7 in the front of the imaging head 2. An image of the object is input through the exposed part of the imaging optical system.

The lens barrel 5 is formed to protrude from the front of the imaging head 2 and becomes a cover around a projection optical system 20 of the image projection section 13. The lens barrel 5 holds the projection optical system 20, allows the entire projection optical system 20 to be moved for focusing, and prevents the projection optical system 20 from being damaged. A part of the lens of the projection optical system 20 of the image projection section 13 is exposed from an end face of the lens barrel 5, and image signal light is projected from the exposed part to a projection plane.

The viewfinder 6 includes an optical lens provided from the rear face to the front face of the imaging head 2. The user looking into the viewfinder 6 from the rear of the imaging head 2 can see a range almost identical to a range in which the imaging optical system 21 forms an image on a CCD 22.

The flash 7 is a light source providing an additional amount of light required in the digital camera mode, for instance, and has a discharge tube filled with a xenon gas. The flash 7 can be used repeatedly when an internal capacitor (not shown) of the imaging head 2 discharges.

A release button 8 is disposed in the top face of the imaging head 2 near the front face. A mode changeover switch 9 is disposed behind the release button 8. An LCD monitor 10 is disposed at a side opposite to the mode changeover switch 9.

The release button 8 includes a two-position pushbutton switch which can be half-pressed or full-pressed. The state of the release button 8 is managed by a processor 15, which will be described later. When the release button 8 is half-pressed, a commonly-known autofocus (AF) function and autoexposure (A) function are activated under the control of the processor 15, and the focus, aperture, and shutter speed are adjusted. When the release button 8 is full-pressed, an image is taken, or the like.

The mode changeover switch 9 is a switch for setting the digital camera mode, webcam mode, 3D image mode, planar image mode, off mode, or any other mode. The state of the mode changeover switch 9 is managed by the processor 15. When the processor 15 detects the state of the mode changeover switch 9, corresponding mode processing is executed.

The LCD monitor 10 includes a liquid crystal display and shows an image of an image signal received from the processor 15 to the user. The LCD monitor 10 can display an image taken in the digital camera mode or the webcam mode, an image obtained as a result of three-dimensional-shape detection in the 3D image mode, or a planar image in the planar image mode, and the like.

On a side face of the imaging head 2, an antenna 11 used as a radio frequency (RF) interface is provided in an upper part, and a coupling member 12 for coupling the imaging head 2 and the arm member 3 is also disposed.

The antenna 11 is used to send an image data taken in the digital camera mode, a 3D image data taken in the 3D image mode, or the like through an RF driver 24, which will be described later, to an external interface by radio communication.

The coupling member 12 is shaped like a ring, and a female thread is formed on its inner face. The coupling member 12 is rotatably secured to a side face of the imaging head 2. A male thread is formed on one end of the arm member 3. The imaging head 2 and the arm member 3 can be detachably coupled by fitting the female thread of the coupling member 12 and the male thread of the arm member 3, and the imaging head 2 can be fixed at a certain angle. The imaging head 2 can be used as a usual digital camera when it is detached from the arm member 3.

The arm member 3 holds the imaging head 2 in a certain variable imaging position and has a pleated flexible pipe that can be bent into a desired shape. The arm member 3 can direct the imaging head 2 into a desired position.

The base 4 is placed on a desk or a table and supports the imaging head 2 and the arm member 3. The base 4 is shaped like a letter L in a plan view and can support the imaging head 2 and the like with stability. The base 4 and the arm member 3 are detachably coupled. This makes it easy to carry the image input-and-output apparatus 1 and to house the image input-and-output apparatus 1 in a small space.

Figure 2:
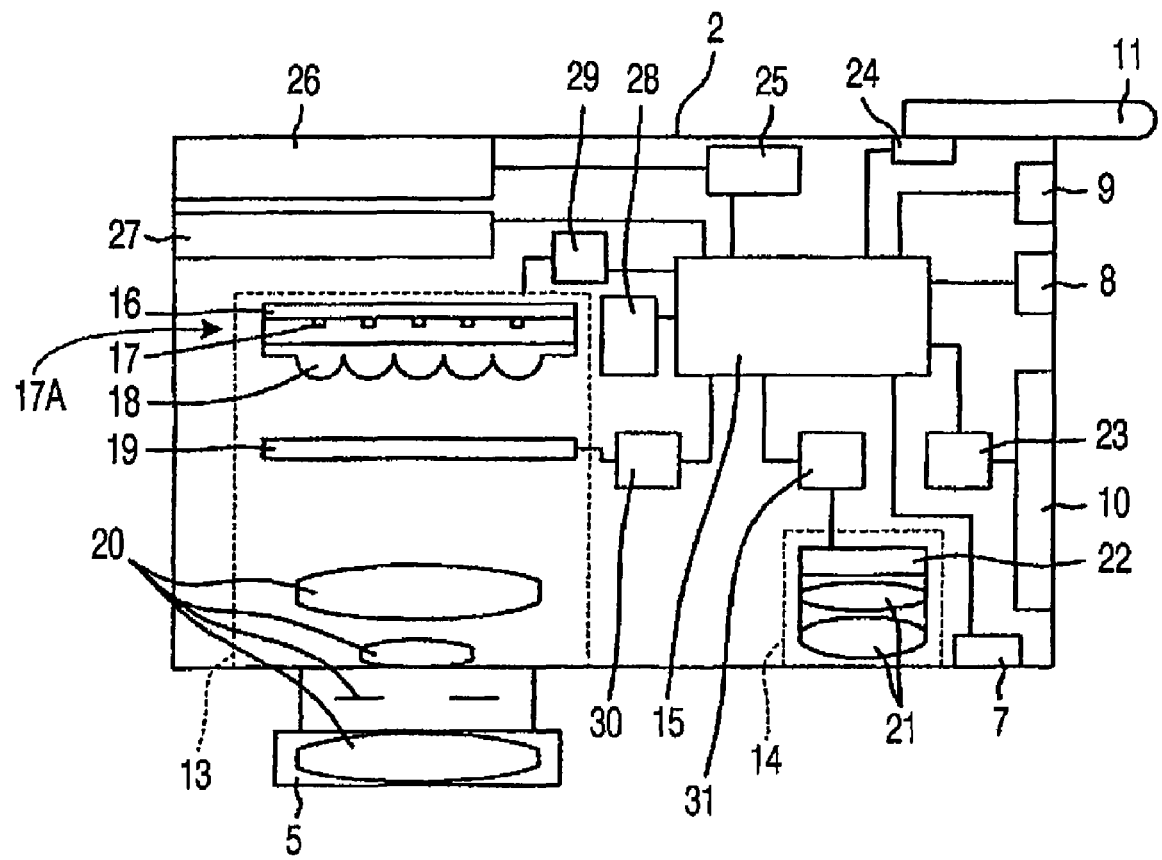
FIG. 2 is a view showing an internal configuration of an imaging head.

FIG. 2 is an outline diagram showing an internal configuration of the imaging head 2. The imaging head 2 contains the image projection section 13, the image pickup section 14, and the processor 15.

The image projection section 13 is a unit for projecting a certain image onto the projection plane. The image projection section 13 includes a substrate 16, a plurality of LEDs 17 (hereafter collectively referred to as an LED array 17A), a light-source lens 18, a projection LCD 19, and the projection optical system 20, in that order in the projecting direction. The image projection section 13 will be described in further detail later with reference to FIGS. 3(a) to 3(c).

The image pickup section 14 is a unit for taking an image of original P serving as the object. The image pickup section 14 includes the imaging optical system 21 and the CCD 22 along the light input direction.

The imaging optical system 21 has a plurality of lenses. The imaging optical system 21 has a commonly-known auto-focus function, automatically adjusts the focal length and aperture, and forms external light into an image on the CCD 22.

The CCD 22 has photoelectric transducers such as a matrix of charge coupled devices (CCDs). The CCD 22 generates a signal depending on the color and intensity of light of the image formed on the surface of the CCD 22 through the imaging optical system 21, converts the signal to digital data, and outputs the data to the processor 15.

The processor 15 is electrically connected to the flash 7, the release button 8, the mode changeover switch 9, an external memory 27, and a cache memory 28. The LCD monitor 10 is connected through a LCD monitor driver 23, the antenna 11 is connected through an RF driver 24, a battery 26 is connected through a power interface 25, the LED array 17A is connected through a light-source driver 29, the projection LCD 19 is connected through a projection LCD driver 30, and the CCD 22 is connected through a CCD interface 31, to the processor 15. These components connected to the processor 15 are managed by the processor 15.

The external memory 27 is a detachable flash ROM and stores three-dimensional information and an image taken in the digital camera mode, webcam mode, or 3D image mode. An SD card, compact flash (registered trademark) card, and the like can be used as the external memory 27, for instance.

The cache memory 28 is a high-speed storage device. For instance, an image taken in the digital camera mode is transferred to the cache memory 28 at a high speed, and the image is stored in the external memory 27 after the processor 15 finishes image processing. More specifically, an SDRAM, DDRRAM, and the like can be used.

The power interface 25, the light-source driver 29, the projection LCD driver 30, and the CCD interface 31 are integrated circuits (ICs). The power interface 25, the light-source driver 29, the projection LCD driver 30, and the CCD interface 31 control the battery 26, the LED array 17A, the projection LCD 19, and the CCD 22, respectively.

Figure 3:
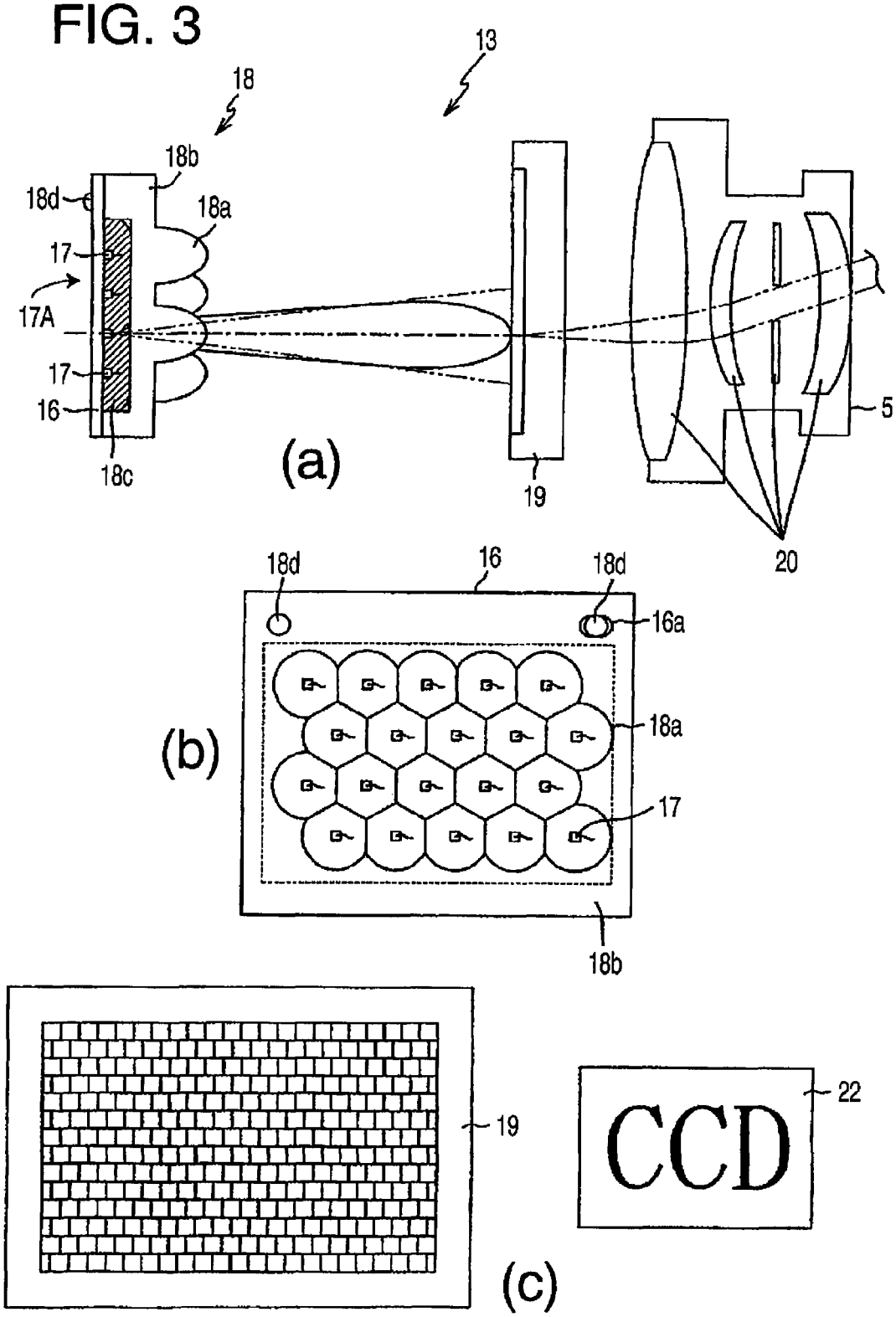
FIG. 3(a) is a magnified view of an image projection section.
FIG. 3(b) is a plan view of a light-source lens.
FIG. 3(c) is a front view of a projection LCD.

FIG. 3(a) is a magnified view of the image projection section 13, FIG. 3(b) is a plan view of the light-source lens 18, and FIG. 3(c) is a view showing a positional relationship of the projection LCD 19 and the CCD 22. As has been described earlier, the image projection section 13 includes the substrate 16, the LED array 17A, the light-source lens 18, the projection LCD 19, and the projection optical system 20, along the direction of projection.

The LED array 17A is mounted to, and electrical wiring for the LED array 17A is installed in, the substrate 16. More specifically, the substrate 16 can be an aluminum substrate coated with an insulating resin and a pattern formed by a nonelectrolytic plating on the coating or an epoxy-glass-rigid-core substrate with a single-layer or multilayer structure.

The LED array 17A is a light source emitting radial light toward the projection LCD 19. The LED array 17A includes rows of staggered light emitting diodes (LEDs) 17 provided on the substrate 16. The LEDs 17 are pasted to the substrate 16 by a silver paste and electrically connected to the substrate 16 through bonding wire.

The plurality of LEDs 17 used as a light source can convert electricity to light with higher efficiency (higher electrooptic conversion efficiency) than an incandescent lamp, a halogen lamp, or the like used as the light source, and can suppress the generation of infrared rays and ultraviolet rays. According to the embodiment, the light source can be driven with reduced power requirements, and a power saving and a longer life can be achieved. A rise in temperature of the apparatus can also be reduced.

Because the LEDs 17 generates greatly fewer heat rays than the halogen lamp and the like, the light-source lens 18 and the projection optical system 20 can use a plastic lens, which will be described later. Consequently, the cost and weight of the light-source lens 18 and the projection optical system 20 can be reduced in comparison with when a glass lens is used.

The LEDs 17 constituting the LED array 17A emit light in the same color, or amber light. The LEDs 17 are made of a material of four elements: Al, In, Ga, and P. Accordingly, chromatic aberration correction which would be required when light is emitted in different colors is not necessary, and an achromatic lens for correcting chromatic aberration is not required in the projection optical system 20. A projection means of an inexpensive material with a simple surface structure can be provided.

Because the amber LED of the four-element material having an electrooptic conversion efficiency of about 80 lumen/W higher than the LED of another color is used, a higher luminance, power saving, and a lower life can be achieved. The effect of the staggered arrangement of the LEDs 17 will be described with reference to FIGS. 4(a) to 4(c).

To be more specific, the LED array 17A has fifty-nine LEDs 17, and each LED 17 is driven at 20 mA and 2.5 V (50 mW). The fifty-nine LEDs 17 consume about 3 watts of power. When the projection optical system 20 projects light emitted from the LED 17 through the light-source lens 18 and the projection LCD 19, the luminance of the ray bundle is about 25 ANSI lumen even in full projection.

When a three-dimensional shape of an object such as a human or animal face is detected in the 3D image mode, for instance, this level of luminance does not give glare to the person or animal, enabling the three-dimensional shape to be detected while the person or animal is opening their eyes.

The light-source lens 18 is a lens as a light collecting optical system for collecting light radially emitted from the LED array 17A. The material of the lens is made of optical plastics such as an acrylic resin.

To be more specific, the light-source lens 18 includes a convex lens section 18a provided to jut out toward the side of the projection LCD 19 in a position facing each LED 17 of the LED array 17A, a base section 18b supporting the convex lens section 18a, an epoxy sealing agent 18c for filling an opening containing the LED array 17A in the internal space of the base section 18b for sealing the LED 17 and gluing the substrate 16 and the light-source lens 18, and a positioning pin 18d protruding from the base section 18b to the side of the substrate 16 for connecting the light-source lens 18 and the substrate 16.

The light-source lens 18 is fixed on the substrate 16 by inserting the positioning pin 18d into an oval hole 16a made in the substrate 16 while holding the LED array 17A in the internal opening.

Therefore, the light-source lens 18 can be provided in a reduced space. The substrate 16 has a function to hold the LED array 17A and also a function to support the light-source lens 18, eliminating the need for providing a separate support of the light-source lens 18, so that the number of components can be reduced.

The lens sections 18a are disposed in positions facing the LEDs 17 of the LED array 17A in a one-to-one relationship.

The radial light emitted from the LEDs 17 is efficiently collected by the lens sections 18a facing the LEDs 17, and the light is applied to the projection LCD 19 as high-directivity radial light, as shown in FIG. 3(a). One reason of the high directivity is that variations in transmittance in the plane can be suppressed by applying light almost perpendicular to the projection LCD 19. Another reason of the high directivity is that light which can pass an internal aperture is limited to a range of +5% to −5% of the normal because the projection optical system 20 has telecentric characteristics with an incident NA of about 0.1. Accordingly, important factors to improve the image quality are that the angle of outgoing light from the LEDs 17 is adjusted to be normal to the projection LCD 19 and that most of the ray bundles fall in the range of +5% to −5%. If light beyond the normal range is applied to the projection LCD 19, the optical rotation of the liquid crystal changes the transmittance in accordance with the incident angle, resulting in variations in transmittance.

The projection LCD 19 is a spatial modulation element which performs spatial modulation of light collected through the light-source lens 18 and outputs image signal light to the projection optical system 20. To be more specific, the projection LCD 19 includes a flat liquid crystal display having a height and width different from each other in length.

As shown in FIG. 3(c), the pixels of the projection LCD 19 are arranged in parallel rows, alternating between one linear pixel row along the longitudinal direction of the projection LCD 19 and another pixel row with pixel positions shifted by a predetermined distance along the longitudinal direction of the projection LCD 19 from those in the one linear pixel row.

FIG. 3(c) shows the face on the side of the front of the imaging head 2, and light is emitted toward the projection LCD 19 from the other face. The light returned from the object is sent from the face shown in FIG. 3(c) to the other face, and the image of the object is formed on the CCD 22.

Since the pixels of the projection LCD 19 are arranged in rows in the longitudinal direction in a staggered configuration, light subjected to spatial modulation by the projection LCD 19 can be controlled at a 1/2 pitch in a direction perpendicular to the longitudinal direction (in a transverse direction). Accordingly, the projection pattern can be controlled at a small pitch, and a high-precision three-dimensional shape can be detected with a high resolution.

When striped pattern light including a series of alternate light and dark patterns is thrown onto the object to detect the three-dimensional shape of the object in the 3D image mode or planar image mode, which will be described later, the boundaries between the light and dark patterns can be controlled at a 1/2 pitch by aligning the stripe with the transverse direction of the projection LCD 19. Accordingly, a three-dimensional shape can be detected with high precision.

The projection LCD 19 and the CCD 22 are placed inside the imaging head 2 as shown in FIG. 3(c). To be more specific, because the projection LCD 19 and the CCD 22 are disposed with their wide faces directed almost in the same direction, the image projected from the projection LCD 19 onto the projection plane can be formed directly on the CCD 22 without deflecting the projection image by a half mirror or the like.

The CCD 22 is disposed in the longitudinal direction of the projection LCD 19 (in the direction of rows of pixels). When the three-dimensional shape of an object is detected by triangulation in the 3D image mode or planar image mode, the angle formed by the CCD 22 and the object can be controlled at a 1/2 pitch. Accordingly, the three-dimensional shape can be detected with high precision.

The projection optical system 20 includes a plurality of lenses for projecting image signal light which has passed the projection LCD 19 onto the projection plane. The projection optical system 20 includes telecentric lenses made by a combination of glass and plastic. In the telecentric configuration, a main beam passing the projection optical system 20 is parallel to the optical axis in the incoming space, and the exit pupil is at infinity. The telecentric configuration allows light passing the projection LCD 19 within the range of +5% to −5% of the normal to be projected, and the image quality can be improved.

FIGS. 4(a) to 4(c) are views illustrating an arrangement in the LED array 17A. FIG. 4(a) shows an illumination distribution of light passing the light-source lens 18. FIG. 4(b) is a plan view showing the arrangement in the LED array 17A. FIG. 14(c) is a view showing combined illumination distribution in the face of the projection LCD 19.

As shown in FIG. 4(a), light passing the light-source lens 18 is designed to reach the surface of the projection LCD 19 as light having the illumination distribution shown in the right part of FIG. 4(a) with half angle θ (about 5 degrees) at half maximum.

As shown in FIG. 4(b), the plurality of LEDs 17 are arranged in a staggered configuration on the substrate 16. To be more specific, a plurality of straight rows of LEDs 17 disposed at a pitch of "d" are arranged in parallel at a pitch of √3/2d, and every other row is slid by 1/2d in the same direction with reference to the previous row.

In other words, the distance between one LED 17 and an adjacent LED becomes d (a triangular grid of LEDs is formed).

The length of "d" is determined to be equal to or smaller than the full width at half maximum (FWHM) of the illumination distribution formed on the projection LCD 19 by light emitted from one LED 17.

The combined illumination distribution of light passing the light-source lens 18 and reaching the surface of the projection LCD 19 becomes a straight line with small ripples as shown in FIG. 4(c). Light can be applied to the face of the projection LCD 19 almost uniformly. Accordingly, variations in illumination on the projection LCD 19 can be suppressed, and a high-quality image can be projected as a result.

FIG. 5 is a block diagram showing an electric configuration of the image input-and-output apparatus 1. The components described earlier will not be explained again. The processor 15 has a CPU 35, a ROM 36, and a RAM 37.

The CPU 35 executes various processing in accordance with programs stored in the ROM 36, using the RAM 37. Processing executed under the control of the CPU 35 includes the sensing of the pressing of the release button 8, the capturing of image data from the CCD 22, the transfer and storage of the image data, and sensing of the state of the mode changeover switch 9.

The ROM 36 stores a camera control program 36a, a pattern light imaging program 36b, a luminance image generation program 36c, a code image generation program 36d, a code boundary extraction program 36e, a lens aberration correction program 36f, a triangulation calculation program 36g, an original-posture calculation program 36h, and a plane conversion program 36i.

The camera control program 36a is a program related to control of the entire image input-and-output apparatus 1 including main processing shown in FIG. 6.

The pattern light imaging program 36b is a program for imaging the object with and without pattern light projected in order to detect the three-dimensional shape of original P.

The luminance image generation program 36c is a program for taking a difference between the image taken with pattern light projected by the pattern light imaging program 36b and the image taken without pattern light projected and generating a luminance image of the projected pattern light.

Pattern light of a plurality of types is projected in a time series, and images are taken with each type of pattern light. A plurality of types of luminance images are formed by taking the difference between the images taken with pattern light projected and corresponding images taken without pattern light projected.

The code image generation program 36d is a program for generating a code image having a certain code assigned to each pixel by superposing a plurality of luminance images generated by the luminance image generation program 36c.

The code boundary extraction program 36e is a program for obtaining code boundary coordinates with sub-pixel precision by using the code image generated by the code image generation program 36d and the luminance image generated by the luminance image generation program 36c.

The lens aberration correction program 36f is a program for correcting the aberration of the imaging optical system 20 with respect to the code boundary coordinates obtained with sub-pixel precision by the code boundary extraction program 36e.

The triangulation calculation program 36g is a program for calculating the three-dimensional coordinates of a real space with respect to the boundary coordinates from the boundary coordinates of the code after aberration correction by the lens aberration correction program 36f.

The original-posture calculation program 36h is a program for inferring the three-dimensional shape of original P from the three-dimensional coordinates calculated by the triangulation calculation program 36g.

The plane conversion program 36i is a program for generating a planar image appeared to be taken in front of original P, on the basis of the three-dimensional shape of original P calculated by the original-posture calculation program 36h.

The RAM 37 includes an image-with-pattern-light storage section 37a, an image-without-pattern-light storage section 37b, a luminance image storage section 37c, a code image storage section 37d, a code boundary coordinate storage section 37e, an ID storage section 37f, an aberration correction coordinate storage section 37g, a three-dimensional coordinate storage section 37h, an original-posture calculation result storage section 37i, a plane conversion result storage section 37j, a projection image storage section 37k, and a working area 37l, assigned as storage areas.

The image-with-pattern-light storage section 37a stores an image with pattern light taken with pattern light projected onto original P, by the pattern light imaging program 36b. The image without pattern light storage section 37b stores an image without pattern light taken without pattern light projected onto original P, by the pattern light imaging program 36b.

The luminance image storage section 37c stores a luminance image generated by the luminance image generation program 36c. The code image storage section 37d stores a code image generated by the code image generation program 36d. The code boundary coordinate storage section 37e stores the boundary coordinates of each code obtained with sub-pixel precision extracted by the code boundary extraction program 36e. The ID storage section 37f stores an ID and the like assigned to a luminance image having a change in brightness in the position of a pixel having a boundary. The aberration correction coordinate storage section 37g stores the boundary coordinates of a code after aberration correction by the lens aberration correction program 36f. The three-dimensional coordinate storage section 37h stores the three-dimensional coordinates of the real space calculated by the triangulation calculation program 36g.

The original-posture calculation result storage section 37i stores parameters of the three-dimensional shape of original P calculated by the original-posture calculation program 36h. The plane conversion result storage section 37j stores the result of plane conversion by the plane conversion program 36i. The projection image storage section 37k stores image information projected by the image projection section 13. The working area 37l holds data temporarily used for calculation by the CPU 15.

FIG. 6 is a flow chart of the main processing executed under the control of the CPU 35. Digital camera processing S605, webcam processing S607, 3D image processing S607, and planar image processing S611 of the main processing will be described later in further detail.

First, in the main processing, power is turned on (S601), and the processor 15, interfaces, and the like are initialized (S602).

A key scan (S603) is carried out to determine the state of the mode changeover switch 9. It is determined whether the mode changeover switch 9 selects the digital camera mode (S604). If the digital camera mode is selected (S604: Yes), the digital camera processing, which will be described later, starts (S605).

If the digital camera mode is not selected (S604: No), it is determined whether the mode changeover switch 9 selects the webcam mode (S606). If the webcam mode is selected (S606: Yes), the webcam processing, which will be described later, starts (S607).

If the webcam mode is not selected (S605: No), it is determined whether the mode changeover switch 9 selects the 3D image mode (S608). If the 3D image mode is selected (S608: Yes), the 3D image processing, which will be described later, starts (S609).

If the 3D image mode is not selected (S608: No), it is determined whether the mode changeover switch 9 selects the planar image mode (S610). If the planar image mode is selected (S610: Yes), the planar image processing, which will be described later, starts (S611).

If the planar image mode is not selected (S610: No), it is determined whether the mode changeover switch 9 selects the off mode (S612). If the off mode is not selected (S612: No), processing from step S603 is repeated. If it is determined in step S612 that the off mode is selected (S612: Yes), the processing ends.

FIG. 7 is a flow chart of the digital camera processing (S605 in FIG. 6). The digital camera processing is performed to obtain an image taken by the image pickup section 14.

First, in this processing, a high-resolution setting signal is sent to the CCD 22 (S701). With this signal, a high-quality image can be provided to the user.

A viewfinder image (image in the range seen through the viewfinder 6) is displayed on the LCD monitor 10 (S702). The user can see the image to be taken (imaging range), before taking an actual image, by seeing the image displayed on the LCD monitor 10 without looking into the viewfinder 6.

The release button 8 is scanned (S703a) to check whether the release button 8 is half-pressed (S703b). If the button is half-pressed (S703b: Yes), the autofocus (AF) function and the autoexposure (AE) function are activated to adjust the focus, aperture, and shutter speed (S703c). If the button is not half-pressed (S703b: No), the processing from step S703a is repeated.

The release button 8 is scanned again (S703d) to check whether the release button 8 is full-pressed (S703e). If the release button 8 is full-pressed (S703e: Yes), it is checked whether the flash mode is selected (S704).

If the flash mode is selected (S704: Yes), the flash 7 is fired (S705), and the image is taken (S706). If the flash mode is not selected (S704: No), the image is taken without firing the flash 7 (S706). If it is determined that the button is not full-pressed (S703e: No), the processing from step S703a is repeated.

The taken image is transferred from the CCD 22 to the cache memory 28 (S707), and the image stored in the cache memory 28 is displayed on the LCD monitor 10 (S708). By transferring the image to the cache memory 28 instead of a main memory, the image can be displayed on the LCD monitor 10 quickly. Then, the image is stored in the external memory 27 (S709).

It is determined whether the mode selected by the mode changeover switch 9 has been changed (S710). If no change is found (S710: Yes), the processing from S702 is repeated. If a change is found (S710: No), the processing ends.

FIG. 8 is a flow chart of the webcam processing (S607 in FIG. 6). The webcam processing is performed to send an image (still image or moving image) taken by the image pickup section 14 to an external network. In this embodiment a moving image is taken and sent to the external network.

First, in the processing, a low-resolution setting signal is sent to the CCD 22 (S801). The commonly-known autofocus function and autoexposure function are activated to adjust the focus, aperture, and shutter speed (S802), and an image taking process starts (S803).

The taken image is displayed on the LCD monitor 10 (S804). The viewfinder image is stored in the projection image storage section 37k (S805). Projection processing, which will be described later, is performed (S806). The image stored in the projection image storage section 37k is projected onto the projection plane.

The taken image is transferred from the CCD 22 to the cache memory 28 (S807). The image transferred to the cache memory 28 is sent through the RF interface to an external network (S808).

It is determined whether the mode selected by the mode changeover switch 9 has been changed (S809). If no change is found (S809: Yes), the processing from S802 is repeated. If a change is found (S809: No), the processing ends.

FIG. 9 is a flow chart of the projection processing (S806 in FIG. 8). The processing is performed to project the image stored in the projection image storage section 37k onto the projection plane by the image projection section 13. First, in the processing, it is checked whether an image is stored in the projection image storage section 37k (S901). If a image is stored (S901: Yes), the image stored in the projection image storage section 37k is transferred to the projection LCD driver 30 (S902). The projection LCD driver 30 sends an image signal corresponding to the image to the projection LCD 19, and the image is displayed on the projection LCD (S903).

The light-source driver 29 is driven (S904). An electric signal from the light-source driver 29 turns on the LED array 17A (S905), and the processing ends.

When the LED array 17A is turned on, light emitted from the LED array 17A passes the light-source lens 18 and reaches the projection LCD 19. The projection LCD 19 performs spatial modulation corresponding to the image signal sent from the projection LCD driver 30, and image signal light is output. The image signal light output from the projection LCD 19 passes the projection optical system 20 and projects an image onto the projection plane.

FIG. 10 is a flow chart of the 3D image processing (S609 in FIG. 6). The 3D image processing is performed to detect the three-dimensional shape of the object, obtain the detected three-dimensional shape as a 3D image, and display and project the 3D image.

First, in the processing, a high-resolution setting signal is sent to the CCD 22 (S1001). A viewfinder image is displayed on the LCD monitor 10 (S1002).

The release button 8 is scanned (S1003a) to check whether the release button 8 is half-pressed (S1003b). If the button is half-pressed (S1003b: Yes), the autofocus (AF) function and autoexposure (AE) function are activated to adjust the focus, aperture, and shutter speed (S1003c). If the button is not half-pressed (S1003b: No), the processing from step S1003a is repeated.

The release button 8 is scanned again (S1003d) to check whether the release button 8 is full-pressed (S1003e). If the release button 8 is full-pressed (S1003e: Yes), it is checked whether the flash mode is selected (S1003f).

If the flash mode is selected (S1003f: Yes), the flash 7 is fired (S1003g), and the image is taken (S1003h). If the flash mode is not selected (S1003f: No), the image is taken without firing the flash 7 (S1003h). If it is determined in step S1003e that the button is not full-pressed (S1003e: No), the processing from step S1003a is repeated.

Three-dimensional-shape detection processing, which will be described later, is performed, and the three-dimensional shape of the object is detected (S1006).

The three-dimensional shape detected in the three-dimensional-shape detection processing (S1006) is stored in the external memory 27 (S1007), and the result of three-dimensional-shape detection is displayed on the LCD monitor 10 (S1008). The result of three-dimensional-shape detection is displayed as a group of three-dimensional coordinates (XYZ) of vertices measured in the real space.

The vertices obtained as a result of three-dimensional shape detection are connected to form a polygon, and a 3D image (3D CG image) displaying the surfaces is stored in the projection image storage section 37k as a result image of three-dimensional-shape detection (S1009). Projection processing is performed (S1010), in the same way as the projection processing of step S806 in FIG. 8. When an inverse function of an equation for converting coordinates on the projection LCD 19 to three-dimensional coordinates, which will be described with reference to FIGS. 18(a) and 18(b), is used to calculate the coordinates on the projection LCD 19 corresponding to the obtained three-dimensional coordinates, the resultant three-dimensional coordinates can be projected onto the projection plane.

It is determined whether the mode selected by the mode changeover switch 9 has been changed (S1011). If no change is found (S1011: Yes), the processing from step S702 is repeated. If a change is found (S1011: No), the processing ends.

FIG. 11(a) is a view illustrating the principle of the space code method used to detect a three-dimensional shape in the three-dimensional-shape detection processing (S1006 in FIG. 10). FIG. 11(b) is a view showing pattern light different from that shown in FIG. 11(a). Either of the pattern lights shown in FIG. 11(a) and FIG. 11(b) can be used. A gray level code, which is a multiple-tone code, can also be used.

The space code method is described in detail in Kosuke Sato, et al. "Distance Image Input by Space Code," Transactions of the Institute of Electronics and Communication Engineers of Japan, 85/3 Vol. J68-D No. 3, pp. 369-375.

The space code method is one method of detecting the three-dimensional shape of an object by triangulation between projection light and observed images. As shown in FIG. 11(a), projection light source L and observing instrument O are disposed with a distance D left between them, and the space is divided into narrow fan-shaped areas and coded.

When three mask patterns A, B, and C shown in the figure are projected in sequence from the MSB, each fan-shaped area is coded to "1" of light or "0" of dark according to the mask pattern. For instance, an area including point P is dark with mask patterns A and B and is light with mask pattern C, and is coded as 001 (A=0, B=0, C=1).

Each fan-shaped area is assigned a code corresponding to the direction φ, and the boundary of codes can be considered as one slit light. An image of a scene is taken through each mask by the observing instrument, or a camera, and the light and dark patterns are binarized to configure a bit plane of memory.

The horizontal position (address) of the obtained multiple-bit-plane image corresponds the observing direction θ, and the contents of memory at the address give projection light code φ. The coordinates of a point of interest are determined by θ and φ.

Mask patterns A, B, and C shown in FIG. 11(a) use pure binary codes. If a mask is misaligned, there is a danger that a great error occurs on the boundary of areas.

Point Q in FIG. 11(a) is on the boundary of area 3 (011) and area 4 (100). If mask A is misaligned, the code of area 7 (111) can be given. In other words, a great error can occur if the Hamming distance between adjacent areas is 2 or greater.

It is considered that the coding error can be avoided by using mask patterns where the Hamming distance between adjacent areas is always 1, as shown in FIG. 11(b).

FIG. 12(a) is a flow chart of the three-dimensional-shape detection processing (S1006 in FIG. 10). First, in the processing, imaging processing is performed (S1210). In the imaging processing, striped pattern light (see FIG. 1) including a series of alternate light and dark patterns is projected onto the object in a time series from the image projection section 13 by using the plurality of pure-binary-code mask patterns shown in FIG. 11(a), and an image taken with each pattern light projected and an image taken without the pattern light are obtained.

When the imaging processing ends (S1210), three-dimensional measurement processing is performed (S1220). In the three-dimensional measurement processing, the image with pattern light and the image without pattern light obtained in the imaging processing are used to measure the actual three-dimensional shape of the object. When the three-dimensional measurement processing ends (S1220), the processing ends.

FIG. 12(b) is a flow chart of the imaging processing (S1210 in FIG. 12(a)). The processing is executed in accordance with the pattern light imaging program 36a. First, an image of the object is taken by the image pickup section 14 without projecting pattern light from the image projection section 13, and the image without pattern light is obtained (S1211). The image without pattern light is stored in the image-without-pattern-light storage section 37b.

Counter "i" is initialized (S1212), and it is determined whether the value of counter "i" is the maximum value imax (S1213). The maximum value imax is determined in accordance with the number of mask patterns used. If eight types of mask patterns are used, the maximum value imax is set to 8.

If the value of counter "i" is smaller than the maximum value imax (S1213: Yes), mask pattern "i" is displayed on the projection LCD 19, and pattern light "i" projected through mask pattern "i" is projected onto the projection plane (S1214). The image of the state in which the pattern light is projected is taken by the image pickup section 14 (S1215).

An image with pattern light taken by projecting pattern light "i" onto the object is obtained in this way. The obtained image with pattern light is stored in the image-with-pattern-light storage section 37a.

After the image is taken, projection of pattern light "i" ends (S1216), and counter "i" is incremented by "1" (S1217) to project the next pattern light. The processing from step S1213 is repeated.

When it is determined that the value of counter "i" exceeds the maximum value imax (S1213: No), the processing ends. In the imaging processing, one image without pattern light and the same number of images with pattern light as the maximum value imax are obtained.

FIG. 12(c) is a flow chart of the three-dimensional measurement processing (S1220 in FIG. 12(a)). The processing is executed in accordance with the luminance image generation program 36c. First, in the processing, a luminance image is generated (S1221). The luminance here is a Y value in a YCbCr space and is calculated from the RGB values of each pixel as $$Y=0.2989 \times R+0.5866 \times G+0.1145 \times B$$

By obtaining the Y value of each pixel, a luminance image of each image with pattern light or without pattern light is generated. The generated luminance image is stored in the luminance image storage section 37c. A number corresponding to the pattern light number is assigned to each luminance image.

Generated luminance images are combined by using the space code method described above in accordance with the code image generation program 36d, and a code image of coded pixels is generated (S1222).

The code image can be generated by combining results of comparison between each pixel of the luminance image of an image with pattern light stored in the luminance image storage section 37c and a predetermined luminance threshold. The generated code image is stored in the code image storage section 37d.

The code boundary coordinate detection processing, which will be described later, is performed in accordance with the code boundary extraction program 36e (S1223) to detect the coordinates of the boundary of codes assigned to pixels with sub-pixel precision.

Lens aberration correction processing is performed in accordance with the lens aberration correction program 36f (S1224). Through this processing, an error due to distortion of the imaging optical system 21 in the code boundary coordinates detected in step S1223 can be corrected.

Real space conversion processing based on triangulation is performed in accordance with the triangulation calculation program 36g (S1225). The code boundary coordinates on the CCD space after aberration correction is converted to three-dimensional coordinates in the real space by this processing, and the three-dimensional coordinates are obtained as a result of three-dimensional-shape detection.

Figure 12:
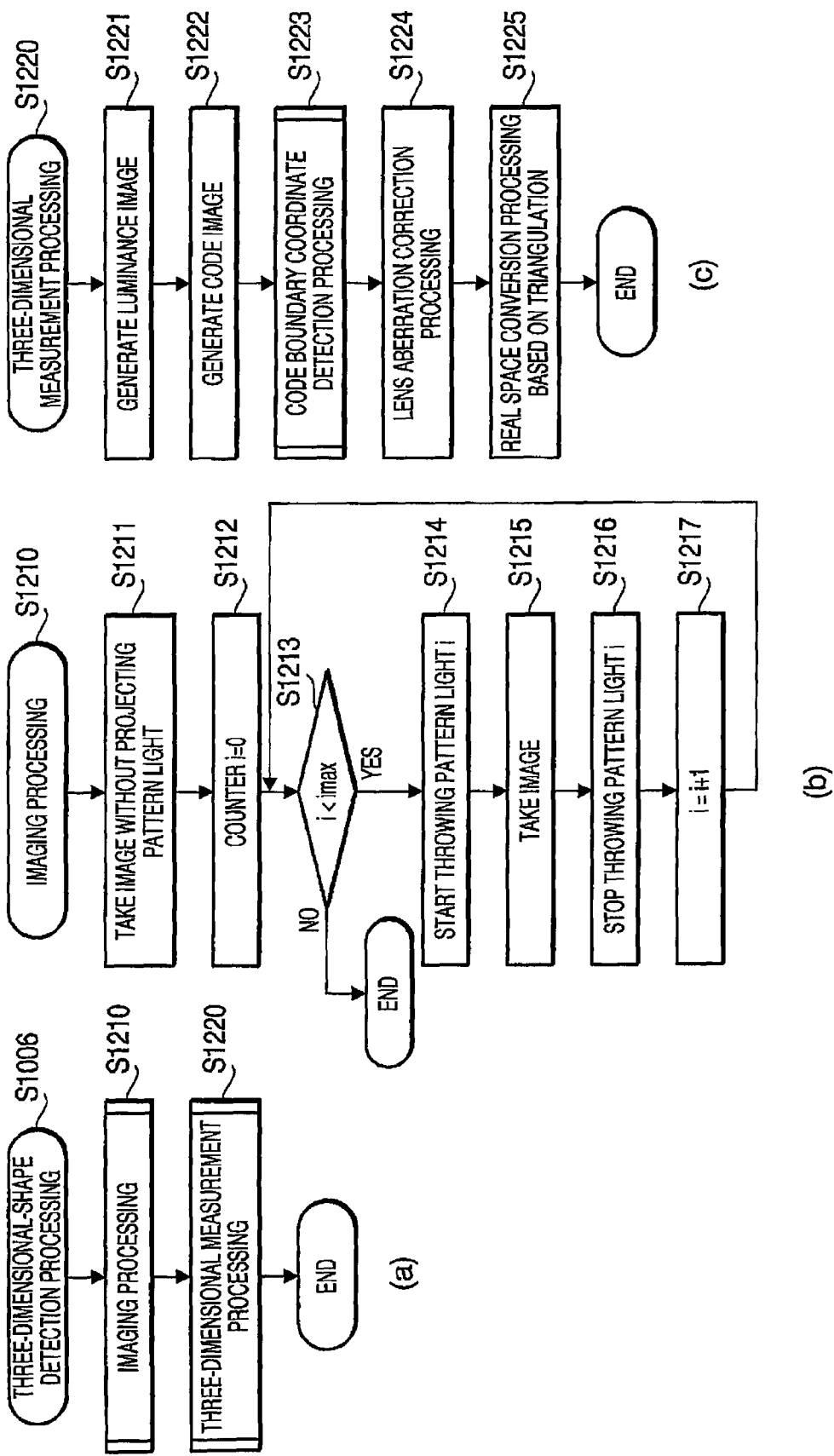

FIG. 13 is a view illustrating an overview of the code boundary coordinate detection processing (S1223 in FIG. 12). An upper diagram shows borderline K serving as a boundary between the actual light and dark patterns in the CCD space. A thick line in the figure indicates the boundary between code "I" and other codes given by coding the pattern light in the space code method.

Coding by the space code method is performed in units of pixels. There is a sub-pixel difference between actual borderline K of pattern light and the coded boundary (thick line in the figure). The code boundary coordinate detection processing is intended for the detection of the coordinates of the code boundary with sub-pixel precision.

First, in the processing, first pixel (3 where code of interest (hereafter referred to as curCode) is changed to another code in a certain detection position (hereafter referred to as curCCDX) is detected (first-pixel detection process).

For instance, check pixels detected in curCCDX in the direction from top to bottom. The pixels above the boundary (thick line) have curCode, and the code of the pixel immediately below the boundary is changed from curCode. This pixel is detected as first pixel G.

All the luminance images having a change in brightness in the position of first pixel G are extracted from the luminance images stored in the luminance image storage section 37c in step S1221 of FIG. 12 (luminance image extraction process).

To identify a pixel area used for approximation, the code image is referenced in the position of curCCDX−2, a position moved to the left of the detection position, to find a pixel where the code changes from the code of interest, curCode, to another, or a boundary pixel (pixel H in detection position of curCCDX−2). A predetermined pixel range extending from the pixel (range of −3 pixels and +2 pixels in the Y-axis direction, in the shown example) is determined (part of pixel range determination means).

An approximate expression (indicated by a thick line in the figure) concerning the pixel position and luminance in the Y direction is obtained in the predetermined range, as expressed in the bottom left graph in the figure. Y coordinate Y1 of a point of intersection with luminance threshold "bTh" given by the approximate expression is obtained (part of boundary coordinate detection process).

Luminance threshold "bTh" may also be calculated from a predetermined range (half of the average luminance of the pixels) or may be a predetermined fixed value. Now, the light-dark boundary can be detected with sub-pixel precision.

Detection position curCCDX−2 is moved to the right by "1", and the same processing as described above is performed in position curCCDX−1 to obtain a representative value in curCCDX−1 (art of boundary coordinate detection process).

The representative value in each detection position is obtained in the pixel area (hatched by parallel lines sloping to the right) determined by the predetermined range in the Y-axis direction about each boundary pixel and the range of curCCDX−2 to curCCDX+2 in the X-axis direction.

The processing is performed for all luminance images having a pixel changing from curCode to another code, and the weighed average of the representative values of the luminance images is used as the boundary coordinate of curCode (part of boundary coordinate detection process).

Now, the code boundary coordinates can be detected with sub-pixel precision, and the three-dimensional shape of the object can be detected with high precision by performing the real space conversion processing (S1225 in FIG. 12) based on triangulation, using the boundary coordinates.

Because the boundary coordinates can be detected with sub-pixel precision by using the approximate expressions calculated on the basis of the luminance images, the number of images to be taken should not be increased. The pattern light of light and dark patterns of pure binary codes can be used, and special pattern light of gray code does not need to be used.

In this embodiment, the pixel area for approximation is described as an area determined by the range of −3 pixels and +2 pixels in the Y-axis direction around the boundary pixel in each detection position and the range of cur CCDX−2 to curCCDX+2 of the detection positions in the X-axis direction, but the pixel area is not limited to that determined by those Y-axis range and the X-axis range. For instance, the pixel range can be just a predetermined Y-axis range around the boundary pixel in detection position curCCDX.

FIG. 14 is a flow chart of the code boundary coordinate detection processing (S1223 in FIG. 12(c)). This processing is executed in accordance with the code boundary extraction program 36e. First, in the processing, the pixels in a code boundary coordinate array in the CCD space are initialized (S1401), and curCCDX is set to the initial coordinate (S1402).

It is determined whether curCCDX is lower than or equal to the final coordinate (S1403). If curCCDX is lower than or equal to the final coordinate (S1403: Yes), curcode is set to 0 (S1404). curCode is set to the minimum value at the beginning.

It is determined whether curCode is smaller than the maximum code (S1405). If curcode is smaller than the maximum code (S1405: Yes), a curCode pixel is searched for with reference to the code image at curCCDX (S1406). It is checked whether a curCode pixel is present (S1407).

If a curCode pixel is present (S1407: Yes), a pixel having a code greater than curcode is searched for with reference to the code image at curCCDX (S1408). It is determined whether a pixel having a code greater than curCode is present (S1409).

If a pixel having a code greater than curCode is present (S1409: Yes), processing to determine the boundary with sub-pixel precision, which will be described later, is performed (S1410). curCode is incremented by "1" to obtain the boundary coordinates of the next curcode (S1411), and the processing from S1405 is repeated.

The boundary is present in the position of s pixel having curCode or the position of a pixel having a greater code. In the present embodiment, it is provisionally assumed that the boundary is in the position of a pixel having a code greater than curCode.

If curCode is not present (S1407: No), or if there is no pixel having a code greater than curCode (S1409: No), curCode is incremented by "1" to obtain the boundary coordinate with respect to the next curCode (S1411), and the processing from step S1405 is repeated.

The processes of steps S1405 to S1411 are repeated to each code of 0 to the maximum code. When curcode exceeds the maximum code (S1405: No), the detection position is changed by adding dCCDX to curCCDX (S1412). The processing from step S1403 is repeated for the new detection position.

When curCCDX exceeds the final coordinate (S1403), that is, when the detection with respect to each position from the initial coordinate to the final coordinate ends, the processing ends.

FIG. 15 is a flow chart of the processing for obtaining the code boundary coordinate with sub-pixel precision (S1410 in FIG. 14).

First, in this processing, all the luminance images having a change in brightness in the position of a pixel having a code greater than curCode detected in step S1409 in FIG. 14 are extracted (S1501) from the luminance images stored in the luminance image storage section 37c in step S1221 of FIG. 12.

The mask pattern numbers of the extracted luminance images are stored in array PatID☐, and the number of extracted luminance images is stored in noPatID (S1502). Array PatID☐ and noPatID are stored in the ID storage section 37f.

Counter "i" is initialized (S1503). It is checked whether the value of counter "i" is smaller than no PatID (S1504). If the value is smaller (S1504: Yes), a CCDY value of the boundary is obtained with respect to the luminance image having the mask pattern number of PatID[i] corresponding to counter "i", and the value is stored in fCCDY[i](S1505).

When the process of step S1505 ends, counter "i" is incremented by "1" (S1506), and the processing from step S1504 is repeated. If it is determined that the value of counter "i" is greater than noPatID (S1504: No), that is, when the process of step S1505 is completed for all the luminance images extracted in step S1501, the weighed average of fCCDY[i] obtained in the process of step S1505 is calculated, and the result is set as the boundary value (S1507).

Instead of the weighted average, the median value of fCCDY[i] obtained in the process of step S1505 may be calculated and set as the boundary value. The boundary value may also be calculated statistically.

The boundary coordinates are expressed by the coordinate of curCCDX and the weighed average obtained in step S1507. The boundary coordinates are stored in the code boundary coordinate storage section 37e, and the processing ends.

FIG. 16 is a flow chart of processing for obtaining the CCDY value of the boundary with respect to the luminance image having a mask pattern number of PatID[i](S1505 in FIG. 15).

First, the process expressed as ccdx=MAX(curCCDX−dx, 0), that is, the process for setting a greater value of "curCDX−dx" and "0" as ccdx, is performed, and counter "j" is initialized (S1601).

To be more specific, "0" in step S1601 means the minimum CCDX value. If the curCCDX value of the current detection position is "1" and if a predetermined dx value is "2", curCDX−dx=−1 is smaller than the minimum CCDX value of "0". The ccdx value is set to "0" for subsequent processes.

In other words, smaller positions below the minimum CCDX value are eliminated from the subsequent processes.

The dx value can be predetermined to any integer, including "0". In the case shown in FIG. 13, dx is set to "2", and the ccdx value is set to "curCCDX−2" according to the case shown in FIG. 13.

It is determined whether ccdx≦MIN(curCCDX+dx, ccdW−1) (S1602). The left side, MIN(curCCDX+dx, ccdW−1), means the smaller value of curCCDX+dx and the maximum value ccdW of the CCDX value minus 1. The value and the ccdx value are compared.

Positions greater than the maximum CCDX value are eliminated from the subsequent processes.

If ccdx is smaller than MIN(curCCDX+dx, ccdW−1) (S1602: Yes), the eCCDY value in the position of a pixel having a boundary is obtained with reference to the code image and the luminance image to which PatID[i] is assigned (S1603).

If the detection position is curCCDX−1 as shown in FIG. 13, pixel I is detected as a pixel that can have the boundary, and the eCCDY value is obtained in the position of pixel I.

Polynomial approximate expression Bt=fb(ccdy) with respect to luminance in the ccdy direction is obtained within the range of MAX(eCCDY−dy, 0)≦ccdy≦MIN(eCCDY+dy−1, ccdH−1), from the luminance image having a mask patter number of PatID[i](S1604).

The ccdy value at the intersection of polynomial approximate expression Bt and luminance threshold bTh is obtained, and the value is stored in efCCDY[i] (S1605). The boundary coordinates can be detected with sub-pixel precision through steps S1604 and S1605.

Next, ccdx and counter "j" each are incremented by "1" (S1606), and the processing from step S1602 is repeated. The boundary is detected in each detection position with sub-pixel precision in the predetermined range about curCCDX to the right and left.

If it is determined that ccdx is greater than MIN(curCDX+dx, ccdW−1) (S1602: No), polynomial approximate expression of ccdy=fy(ccdx) is obtained for efCCDY[i] calculated in the range of curCCDX−dx to CCDX+dx (S1607). This processing uses each value detected in step S1606, and the boundary coordinate detection can be performed with a higher precision than boundary coordinate detection in one detection position.

The intersection of the obtained polynomial approximate expression and curCCDX is specified as the CCDY value of the boundary with respect to the luminance image having a mask pattern number of PatID[i] (S1608), and the processing ends. As shown in the flow chart of FIG. 15, all the processing described above is carried out for each of the extracted luminance images, and the weighed average of the obtained boundary coordinates is obtained, and the result is used as the final boundary coordinate (S1507). Therefore, the precision of boundary coordinate detection can be improved further.

FIGS. 17(a) to 17(c) are views illustrating the lens aberration correction processing (S1224 in FIG. 12(c)). Because aberration of the imaging optical system 21 causes the incoming ray bundle to be deviated from a correct image formation position by an ideal lens, the lens aberration correction processing corrects the pixel position of the taken image to the correct position.

The aberration correction is on the basis of data obtained by calculating the aberration of the optical system, using half field angle "hfa", which is an incident angle of light, as a parameter in the image taking range of the imaging optical system 21, as shown in FIG. 17(b).

The aberration correction processing is executed in accordance with the lens aberration correction program 36f, with respect to the code boundary coordinates stored in the code boundary coordinate storage section 37e, and the aberration-corrected data is stored in the aberration correction coordinate storage section 37g.

To be more specific, the correction is made by using camera calibration functions (approximate expressions) of (1) to (3) below for converting coordinates (ccdx, ccdy) of a certain point in the real image to coordinates (ccdcx, ccdcy) in an ideal camera image.

In this case, aberration amount "dist" (%) is expressed by using half field angle "hfa" (deg) as dist=f(hfa). The focal length of the imaging optical system 21 is denoted as focallength (mm), the CCD pixel length is denoted as pixellength (mm), and the coordinates of the center of lens in the CCD 22 are denoted as (Centx, Centy).

$$ccdcx=(ccdx-\text{Cent}x)/(1+\text{dist}/100)+\text{Cent}x \quad (1)$$

$$ccdcy=(ccdy-\text{Cent}y)/(1+\text{dist}/100)+\text{Cent}y \quad (2)$$

$$hfa=\arctan[(((ccdx-\text{Cent}x)^2+(ccdy-\text{Cent}y)^2)^{0.5})\times\text{pixellength/focallength}] \quad (3)$$

FIGS. 18(a) and 18(b) are views illustrating a method of calculating three-dimensional coordinates in a three-dimensional space from coordinates in the CCD space in the real space conversion processing based on triangulation (S1225 in FIG. 12(c)).

The real space conversion processing based on triangulation is executed in accordance with the triangulation calculation program 36g, and the three-dimensional coordinates in the three-dimensional space of the aberration-corrected code boundary coordinates stored in the aberration correction coordinate storage section 37g are obtained. The calculated three-dimensional coordinates are stored in the three-dimensional coordinate storage section 37h.

In this embodiment, the coordinate system of the image input-and-output apparatus 1 with respect to original P curved in the horizontal image taking direction is formed by using the direction of the optical axis of the imaging optical system 21 as the Z axis, a point of VPZ away from the principal point of the imaging optical system 21 along the Z axis direction as the origin point, the horizontal direction with respect to the image input-and-output apparatus 1 as the X axis, and the vertical direction as the Y axis.

The angle of projection from the image projection section 13 to the three-dimensional space (X, Y, Z) is expressed as θp. The distance between the optical axis of the imaging-lens optical system 20 and the optical axis of the image projection section 13 is expressed as D. The field of view of the imaging optical system 21 in the Y direction is from Yftop to Yfbottom. The field of view in the X direction is from Xfstart to Xfend. The length (height) of the CCD 22 in the Y-axis direction is expressed as Hc, and the length (width) in the X-axis direction is expressed as Wc. The angle of projection θp is given in accordance with the code assigned to each pixel.

The three-dimensional space position (X, Y, Z) corresponding to certain coordinates (ccdx, ccdy) in the CCD 22 can be obtained by solving five equations about a triangle formed by a point on the image forming plane of the CCD 22, the point of projection of pattern light, and a point intersecting the X-Y plane.

$$Y=-(\tan\theta p)Z+PPZ+\tan\theta p-D+cmp(X\text{target}) \quad (1)$$

$$Y=-(Y\text{target}/VPZ)Z+Y\text{target} \quad (2)$$

$$X=-(X\text{target}/VP)Z+X\text{target} \quad (3)$$

$$Y\text{target}=Y\!f\text{top}-(ccdcy/Hc)\times(Y\!f\text{top}-Y\!f\text{bottom}) \quad (4)$$

$$X\text{target}=X\!f\text{start}+(ccdcx/Wc)\times(X\!f\text{end}-X\!f\text{start}) \quad (5)$$

In equation (1) above, cmp(Xtarget) is a function for correcting the difference between the imaging optical system 20 and the image projection section 13. In an ideal condition, without no difference, cmp(Xtarget) is assumed to be zero.

In the same way as described above, the relationship between certain coordinates (lcdcx, lcdcy) on the projection LCD 19 included in the image projection section 13 and three-dimensional coordinates (X, Y, Z) in the three-dimensional space can be expressed by equations (1) to (4) below.

In this case, the principal position of the image projection section 13 is expressed as (0, 0, PPZ). The field of view of the image projection section 13 in the Y direction is from Ypftop to Ypfbottom, and the field of view in the X direction is from Xpfstart to Xpfend. The length (height) of the projection LCD 19 in the Y-axis direction is expressed as Hp, and the length (width) in the X-axis direction is expressed as Wp.

$$Y=-(Y\!p\text{target}/PPZ)Z+Y\!p\text{target} \quad (1)$$

$$X=-(X\!p\text{target}/PPZ)Z+X\!p\text{target} \quad (2)$$

$$Y\!p\text{target}=Y\!p\!f\text{top}-(ccdcy/Hp)\times(X\!p\!f\text{top}-X\!p\!f\text{bottom}) \quad (3)$$

$$X\!p\text{target}=X\!p\!f\text{start}+(lcdcx/Wp)\times(X\!p\!f\text{end}-X\!p\!f\text{start}) \quad (4)$$

By giving three-dimensional space coordinates (X, Y, Z) to the equations (1) to (4), LCD space coordinates (lcdcx, ledcy) can be obtained from the equations. Therefore, for instance, an LCD device pattern for projecting a certain shape or letter into the three-dimensional space can be calculated.

FIG. 19 is a flow chart of the planar image processing (S611 in FIG. 6). When an image of curved original P as shown in FIG. 1 is taken or when an image of rectangular original is taken diagonally (the image becomes trapezoidal), for instance, the planer image processing obtains and displays a planar image as if taken from straight original P or taken perpendicularly.

First, in the processing, a high-resolution setting signal is sent to the CCD 22 (S1901), and a viewfinder image is displayed on the LCD monitor 10 (S1902).

The release button 8 is scanned (S1903a) and it is determined whether the release button 8 is half-pressed (S1903b). If the button is half-pressed (S1903b: Yes), the autofocus (AF) function and the autoexposure (AE) function are activated to adjust the focus, aperture, and shutter speed (S1903c). If the button is not half-pressed (S1903b: No), the processing from step S1903a is repeated.

The release button 8 is scanned again (S1903*d*) to check whether the release button 8 is full-pressed (S1903*e*). If the release button 8 is full-pressed (S1903*e*: Yes), it is checked whether the flash mode is selected (S1903*f*).

If the flash mode is selected (S1903: Yes), the flash 7 is fired (S1903*g*), and the image is taken (S1903*h*). If the flash mode is not selected (S1903*f*: No), the image is taken without firing the flash 7 (S1903*h*). If it is determined that the button is not full-pressed (S1903*e*: No), the processing from step S1903*a* is repeated.

Three-dimensional-shape detection processing which is the same as the three-dimensional-shape detection processing (S1006 in FIG. 10) is carried out, and the three-dimensional shape of the object is detected (S1906).

Original-posture calculation processing for obtaining the posture of original P is carried out (S1907), on the basis of the result of the three-dimensional shape detection obtained by the three-dimensional-shape detection processing (S1906). Through the processing, position L, angle θ, and curvature φ(x) of original P with respect to the image input-and-output apparatus 1 are calculated as posture parameters of original P.

On the basis of the calculated results, plane conversion processing, which will be described later, is performed (S1908), and a planar image of straight original P is generated even if the original is curved.

The planar image obtained by the plane conversion processing (S1908) is stored in the external memory 27 (S1909), and the planar image is displayed on the monitor LCD 10 (S1910).

It is checked whether the mode selected by the mode changeover switch 9 has been changed (S1911). If no change is found (S1911: Yes), the processing from step S702 is repeated. If a change is found (S1911: No), the processing ends.

Figure 20:
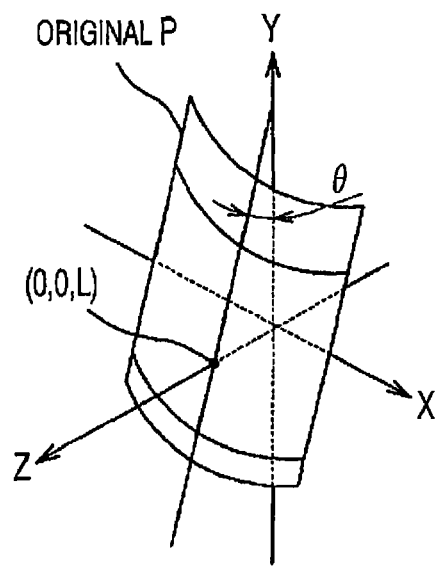
Figure 20:
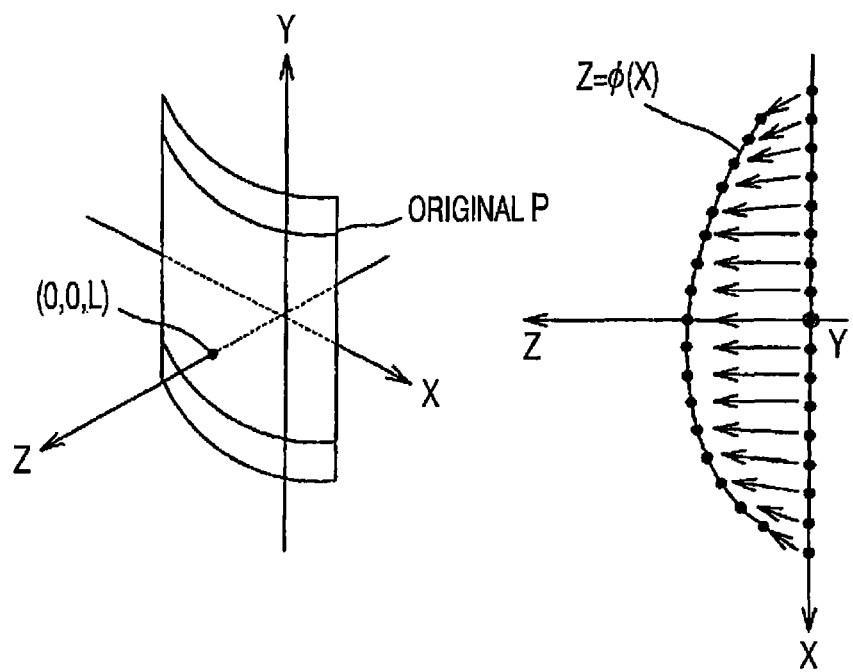

FIGS. 20(*a*) to 20(*c*) are views illustrating the original-posture calculation processing (S1907 of FIG. 19). Suppose that the curvature of original P is uniform in the y direction. First, in the original-posture calculation processing, two curves are obtained by regression curve approximation of two rows of points in the three-dimensional space position, from the coordinate data concerning the code boundary stored in the three-dimensional coordinate storage section 37*h*, as shown in FIG. 20(*a*).

The curves can be obtained from the positional information of an upper quarter and a lower quarter of the projection range of pattern light (boundary between codes 63 and 64 and boundary between codes 191 and 192), for instance.

Suppose there is a straight line connecting points of "0" of the two curves in the X-axis direction and that the point of intersection of the straight line and the Z-axis, that is the point of intersection of the optical axis and original P is expressed as position (0, 0, L) of original P in the three-dimensional space. The angel formed by the straight line and the X-Y plane is expressed as inclination 0 of original P about the X-axis.

As shown in FIG. 20(*b*), rotational transform of original P is carried out by inclination θ about the X-axis in the reverse direction. That is, original P brought to be parallel to the X-Y plane is assumed.

As shown in FIG. 20(*c*), a displacement in the Z-axis direction in the cross section of original P in the X-Z plane can be expressed as a function of X, or curvature φ(X). Position L, angle θ, and curvature φ(X of original P are calculated as the parameters of the original posture, and the processing ends.

FIG. 21 is a flow chart of the plane conversion processing (S1908 in FIG. 19). In this processing, first, the area of the processing is assigned to the working area 371 of the RAM 37, and the variable of counter "b" used in this processing is set to the initial value (b=0) (S2101).

Based on position L, inclination θ, and curvature φ(x) of original P calculated by the original-posture calculation program 36*h*, a rectangular area is formed by points obtained by turning points of four corners of the image without pattern light stored in the image-without-pattern-light storage section 37*b* by −L in the Z-axis direction and by −θ about the X-axis and carrying out inverse transform of transforming into curvature φ(x) (processing equivalent to curvature processing, which will be described later) (rectangular area of an image of the text side of original P observed in an approximately perpendicular direction), and the number of pixels included in the rectangular area is obtained (S2102).

The coordinates on the image without pattern light corresponding to each pixel forming the specified rectangular area are obtained, and the pixel information of each pixel of a planar image is specified from the pixel information around the coordinates.

First, it is determined whether counter "b" reaches the number of pixels "a" (S2103). If counter "b" does not reach the number of pixels "a" (S2103: No), the curvature calculation processing is performed to rotational-transfer one pixel in the rectangular area by curvature φ(x) about the Y-axis (S2104). Rotational transfer of inclination θ about the X-axis is performed (S2105), and a movement is made in the Z-axis direction by distance L (S2106).

From the obtained position in the three-dimensional space, coordinates (ccdcx, ccdcy) on the CCD image taken by an ideal camera are obtained by an inverse function of triangulation (S2107). Coordinates (ccdx, ccdy) on the CCD image taken by a real camera are obtained by an inverse function of the camera calibration in accordance with the aberration characteristics of the imaging optical system 20 used (S2108). The state of the pixel in the corresponding position of the image without pattern light is obtained and stored in the working area 371 of the RAM 37 (S2109).

Counter "b" is incremented by "1" (S2110) to execute the processing from step S2103 to step S2109 with respect to the next pixel.

The processing of from step S2104 to step S2110 is repeated until counter "b" reaches the number of pixels "a" (S2103: Yes). The processing area assigned to the working area 371 for the processing is released (S2111), and the processing ends.

Figure 22:
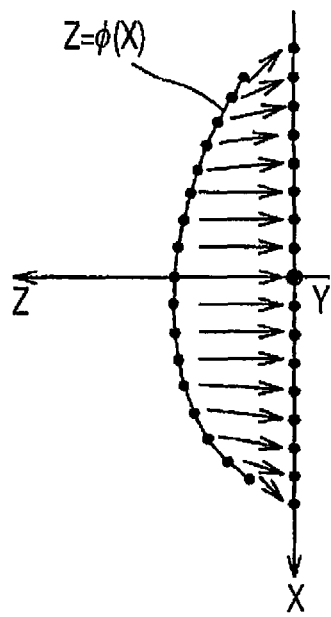
Figure 22:
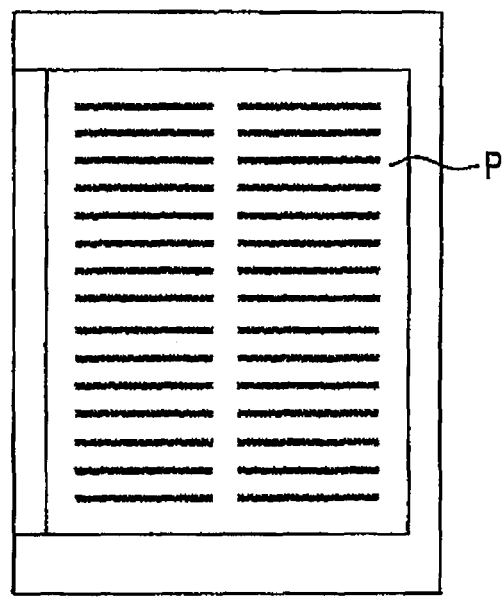

FIG. 22(*a*) is a view illustrating an overview of the curvature processing (S2104 in. FIG. 21), and FIG. 22(*b*) is a view illustrating a planar image of original P formed by the plane conversion processing (S8908 in FIG. 19). The curvature processing is described in detail in "Imaging a Curved Document by Eye Scanner," Transactions DII of the Institute of Electronics, Information and Communication Engineers, Vol. J86-D2 No. 3, p. 409.

Curvature Z=φ(x) is expressed as a polynomial approximate expression obtained when the method of least squares is applied to the sectional shape of the three-dimensional shape formed by obtained code boundary coordinate array (real space), cut by a plane of certain Y value parallel to the XZ plane.

When a curved face is converted to a flat face, a point in the flat face corresponding to a point on Z=φ(x) is associated with the length of the curve from Z=φ(0) to Z=φ(x).

When the image of curved original P as shown in FIG. 1 is taken, a planar image as shown in FIG. 22(*b*) can be obtained with the plane conversion processing, including the curvature processing. With the planar image, precision of OCR processing can be improved. Text and graphics on the original can be clearly recognized through the image.

FIGS. 23(a) and 23(b) are views illustrating a group of light-source lenses 50, as another example of the light-source lens 18 in the embodiment described earlier. FIG. 23(a) is a side view showing the light-source lenses 50, and FIG. 23(b) is a plan view showing the light-source lenses 50. Components identical to those in the embodiment described above will be denoted by the same reference symbols, and a description of the components will be omitted.

The light-source lens 18 in the embodiment described above includes convex aspheric lens sections 18a integrally arranged on the base 18b, aligned with the LEDs 17. In the case shown in FIGS. 23(a) and 23(b), bullet-shaped plastic lenses containing one LED 17 each are separately provided.

The separate light-source lenses 50 containing one LED 17 each allows each LED 17 and the corresponding light-source lens 50 to be positionally determined in one-to-one relationship, The relative position precision can be improved, and the direction of outgoing light can be aligned.

In contrast, when the entire lens array is positioned on the substrate 16, the direction of outgoing light can vary because of a positioning error occurring in die-bonding of the LEDs 17 or a difference in linear expansion coefficient between the lens array and the substrate.

Light coming from the LEDs 17 and projected onto the face of the projection LCD 19 is aligned to the normal to the face of the projection LCD 19 and can pass the diaphragm of the projection optical system 20 evenly. Accordingly, variations in illumination of the projected image can be suppressed, and a high-quality image can be projected as a result. The LED 17 contained in each light-source lens 50 is mounted to the substrate 16 through an electrode 51 having a lead and a reflector.

A frame-shaped elastic fixture member 52 is disposed around one group of light-source lenses 50 and binds the light-source lenses 50 into a certain direction. The fixture member 52 is made from a resinous material such as rubber, plastics, or the like.

Because the light-source lenses 50 are separately formed for the LEDs 17, it is hard to dispose them so that the angles of optical axes formed by the convex tips of the light-source lenses 50 are correctly aligned to the projection LCD 19.

In the case shown in FIGS. 23(a) and 23(b), the fixture member 52 surrounds one group of light-source lenses 50 to bring the outer surfaces of the light-source lenses 50 into contact one another and to bring the light-source lenses 50 into such positions that the optical axis of each light-source lens 50 meets the projection LCD 19 at a correct angle. This configuration allows each light-source lens 50 to project almost perpendicular light onto the projection LCD 19. Because the evenly perpendicular light can be projected onto the face of the projection LCD 19 and can pass the diaphragm of the projection lens evenly, variations in illumination of the projected image can be suppressed. A higher-quality image can be projected.

The fixture member 52 may have certain rigidity predetermined for a certain size. Alternatively, the fixture member 52 may be formed by an elastic material to bring the light-source lenses 50 into certain positions with the elasticity.

FIGS. 24(a) and 24(b) are views illustrating a fixture member 60, as another example different from the fixture member 52 for bringing the light-source lenses 50 into certain positions as shown in FIGS. 23(a) and 23(b). FIG. 24(a) is a perspective view showing a fixed state of the light-source lenses 50, and FIG. 24(b) is a partial section view of the state. Components identical to those described earlier will be denoted by the same symbols, and a description of the components will be omitted.

The fixture member 60 is formed as a flat plate having a through hole 60a conically shaped along the outer surface of each light-source lens 50 in its sectional view. Each light-source lens 50 is fixed when it is inserted into the through hole 60a.

An elastic exertion plate 61 is inserted between the fixture member 60 and the substrate 16, and an elastic O-ring 62 is disposed between the exertion plate 61 and the bottom of each light-source lens 50 in such a manner that the ring encircles the electrode 51.

The LED 17 contained in the light-source lens 50 is mounted to the substrate 16 through the electrode 51 passing through the through hole made in the exertion plate 61 and the substrate 16.

The fixture member 60 fixes each light-source lens 50 in the corresponding through hole 60a having a cross-sectional shape along the outer surface of the lens, so that the optical axis of the light-source lens 50 can be directed to the projection LCD 19 at a correct angle more definitely than when the fixture member 50, described above, is used.

In the assembly process, the LEDs 17 can be fixed to correct positions by a force exerted by the O-rings 62.

A shock that can occur when the apparatus 1 is transported or the like can be absorbed by the elasticity of the O-ring 62. Accordingly, misalignment of the light-source lenses 50 due to the shock, disabling the light-source lenses 50 to direct perpendicular light onto the projection LCD 19, can be avoided.

In this embodiment, the processes of steps S1211 and S1215 in FIG. 12(b) can be associated with an imaging means, an imaging process, or an imaging step. The process of step S1221 in FIG. 12(c) can be associated with a luminance image generation means, a luminance image generation process, or a luminance image generation step. The process of step S1222 in FIG. 12(c) can be associated with a code image generation means, a code image generation process, or a code image generation step. The processing of step S1006 in FIG. 10 can be associated with a three-dimensional-shape calculation means, a three-dimensional-shape calculation process, or a three-dimensional-shape calculation step.

The process of step S1408 in FIG. 14 can be associated with a first-pixel detection means, a first-pixel detection process, or a first-pixel detection step. The process of step S1501 in FIG. 15 can be associated with a luminance image extraction means, a luminance image extraction process, or a luminance image extraction step. The processes of step S1603 and a part of step S1604 can be associated with a pixel area determination means, a pixel area determination process, or a pixel area determination step. The process of another part of step S1604 in FIG. 16 can be associated with an approximate expression calculation means, an approximate expression calculation process, or an approximate expression calculation step. The processes of steps S1505 and S1507 in FIG. 15 can be associated with a boundary coordinate calculation means, a boundary coordinate calculation process, or a boundary coordinate calculation step.

The present invention has been described in accordance with the embodiment, but the present invention is not limited to the embodiment. It can be easily inferred that a variety of modifications are possible unless it deviates from the scope of the present invention.

In the present embodiment, a planar image is obtained and displayed in the planar image mode, but a commonly-known OCR function may be incorporated to read a planar image. In that case, text on the planar image can be read with higher precision than when the curved document is read by the OCR function.

In step S1501 of FIG. 15 of the embodiment, all luminance images including a change in brightness are extracted and provisional CCDY values are obtained for all the images, but all the luminance images do not need to be extracted always. One or more images should be extracted, but the number of images is not limited. If the number of images to be extracted is reduced, the boundary coordinates can be obtained quickly.

In step S1507 of FIG. 15 of the embodiment, a weighed average of fCCDY[i] is obtained. In step S1607 of FIG. 16, values are averaged by using a polynomial approximate expression of efCCDY[i]. The average of the values can be obtained in other methods. A simple average of the values may be obtained. The median value of the values may be obtained. An approximate expression of the values may be calculated to specify a position detected by the approximate expression as a boundary coordinate. A statistical calculation may also be made.

In the three-dimensional-shape detection processing in the planar image mode in the embodiment, striped pattern light including a plurality of types of a series of alternate light and dark patterns is projected to detect the three-dimensional shape of original P. Light used for three-dimensional-shape detection is not limited to that pattern light.

For quick three-dimensional-shape detection of a curved original, two bands of slit light 70 and 71 may be projected from the image projection section 13, as shown in FIG. 25. In this case, the three-dimensional shape can be detected with just two images, faster than when eight types of pattern lights are projected.

In one embodiment of the present invention, the plurality of semiconductor light-emitting elements are arranged with second pitches in two or more parallel rows in a second direction intersecting the row of semiconductor light-emitting elements, and the second pitch may be nearly the same as the first pitch.

In this configuration, the semiconductor light-emitting elements are arranged in two or more parallel rows with second pitches, which are almost the same as the first pitches (pitches with which light-emitting elements are arranged in a straight line in the first direction in the row of semiconductor light-emitting elements), so that decreases in illumination among semiconductor light-emitting elements in parallel rows can be suppressed. A decrease in illumination between adjacent semiconductor elements can be suppressed in two intersecting directions, that is, in the entire plane including them.

In one embodiment of the present invention, a plurality of rows of semiconductor light-emitting elements are provided, and the semiconductor light-emitting elements in adjacent two rows of semiconductor light-emitting elements may be arranged in a staggered configuration.

In this configuration, a decrease in illumination between one semiconductor light-emitting element and surrounding semiconductor light-emitting elements can also be suppressed.

In one embodiment of the present invention, the plurality of semiconductor light-emitting elements may be arranged in parallel rows, alternating between a first row of semiconductor light-emitting elements and another row of semiconductor light-emitting elements shifted in the direction in which the first row of semiconductor light-emitting elements extends by about a half of the first pitch, with pitches of the first pitch multiplied by about √3/2 between the rows.

In this configuration, a decrease in illumination between one semiconductor light-emitting element and surrounding semiconductor light-emitting elements can also be suppressed.

In one embodiment of the present invention, the distance between one of the semiconductor light-emitting elements and semiconductor light-emitting elements surrounding the one of semiconductor light-emitting element may be smaller than or equal to the fall width at half maximum of the illumination distribution of light emitted from one of the semiconductor light-emitting elements, formed by the spatial modulation element.

In this configuration, a decrease in illumination between one semiconductor light-emitting element and surrounding semiconductor light-emitting elements can also be suppressed.

In one embodiment of the present invention, the projection apparatus may have a light-collecting optical system for collecting light emitted from the semiconductor light-emitting elements as high-directivity emission light and outputting the collected light to the spatial modulation element, between the semiconductor light-emitting elements and the spatial modulation element.

In this configuration, light emitted from the semiconductor light-emitting elements can be applied to the spatial modulation element efficiently. Accordingly, power-saving operation can be carried out, and both power and running cost can be reduced.

In one embodiment of the present invention, the light-collecting optical system may have a plurality of lens faces integrally formed, in one-to-one correspondence with the plurality of semiconductor light-emitting elements.

In this configuration, the number of components can be reduced, and consequently the manufacturing cost of the apparatus can be reduced.

In one embodiment of the present invention, the light-collecting optical system may have bullet-shaped lenses separately formed to contain the plurality of semiconductor light-emitting elements in one-to-one correspondence.

In this configuration, the light-collecting property of light emitted from the semiconductor light-emitting elements can be improved. The positioning precision of the semiconductor light-emitting elements and the corresponding lenses can be enhanced.

In one embodiment of the present invention, the projection apparatus may have a frame-shaped fixture member for surrounding the plurality of lenses in the light-collecting optical system to bring the lenses into close contact with one another.

In this configuration, the postures of the lenses can be controlled so that the optical axes of the lenses become parallel and point the spatial modulation element. Accordingly, light can be guided to the spatial modulation element and the projection unit with high efficiency.

In one embodiment of the present invention, the projection apparatus may have a flat fixture member having a fixing hole made in a position corresponding to a predetermined position of each lens, for disposing each lens of the light-collecting optical system in the predetermined position.

In this configuration, the orientation of each lens can be controlled individually. The postures of the individual lenses can be controlled so that the optical axes of the lenses become parallel and point the spatial modulation element. Accordingly, light can be directed to the spatial modulation element and the projection unit with high efficiency.

In one embodiment of the present invention, the sectional shape of the fixing hole may be formed along at least a part of the outer surface of each lens of the light-collecting optical system.

In this configuration, the orientation of each lens can be controlled by bringing the outer surface of each lens into contact with the inner surface of the fixing hole. The postures of the individual lenses can be controlled so that the optical axes of the lenses become parallel and point the spatial modulation element. Accordingly, light can be directed to the spatial modulation element and the projection unit with high efficiency.

In one embodiment of the present invention, the projection apparatus may have an elastic member for coming into contact with the outer surface of the light-collecting optical system.

In the configuration, the elastic member can absorb a shock that can occur when the apparatus is assembled or transported. A force can be applied to bring the semiconductor light-emitting elements into correct positions. Accordingly, misalignment of the light-collecting optical system from the regular position due to a shock in assembly or transportation, disabling light to be emitted perpendicularly to the spatial modulation unit and to be coupled with high efficiency to the projection optical system, can be avoided.

In one embodiment of the present invention, the plurality of semiconductor light-emitting elements may be configured to emit light in the same color.

This configuration eliminates the need for correcting a chromatic aberration that is generated when the projection unit emits light in a plurality of different colors, and a complex achromatic lens does not need to be provided to correct the chromatic aberration. Accordingly, a projection unit of an inexpensive material with a simple surface structure can be provided.

In one embodiment of the present invention, the plurality of semiconductor light-emitting elements are light-emitting diodes, and the light-emitting diodes may emit light in amber.

In this configuration, the efficiency of conversion from electricity to light (electrooptic conversion efficiency) can be improved, in comparison with when light is emitted in another color. Accordingly, power-saving operation can be carried out, and lower power consumption and longer life can be provided.

In one embodiment of the present invention, the projection unit may be configured to include a plastic lens.

In this configuration, a lighter-weighted and more inexpensive optical system can be configured than when all-glass projection unit is configured to project light from the semiconductor light-emitting elements.

In one embodiment of the present invention, the projection unit may be configured by a telecentric lens.

In this configuration, the pupil is at infinity, and just light passing the spatial modulation element almost perpendicularly can be coupled and projected. Accordingly, light can be applied to the spatial modulation element without variations in illumination.

In one embodiment of the present invention, the projection apparatus may include an imaging unit for taking an image of an object disposed in the projection direction while image signal light output from the projection unit is projected onto the object as pattern light and a three-dimensional-shape detection unit for detecting the three-dimensional shape of the object in accordance with the image taken by the imaging unit. In this case, the spatial modulation element may include a flat display, and the display may have a plurality of pixels arranged in a staggered manner.

In this configuration, in addition to providing projection-apparatus functions, the projection apparatus can detect the three-dimensional shape of the object.

The plurality of pixels forming the display, which is a spatial modulation element, are disposed in a staggered arrangement, so that when striped pattern light projected to the object to detect the three-dimensional shape of the object includes a series of alternate light and dark patterns, the light-dark boundary can be controlled with 1/2 pitches by aligning the stripe to the transverse direction of the projection LCD 19. Accordingly, a three-dimensional shape can be detected with high precision.

In one embodiment of the present invention, a wide face of the imaging unit and a wide face of the display may be disposed almost in the same direction.

In this configuration, when an image projected from the display to the projection plane is formed on the imaging unit the total image can be formed on the imaging unit with high efficiency and with high resolution.

In one embodiment of the present invention, the plurality of pixels forming the display may be arranged in parallel rows, alternating between a first row of pixels arranged in a straight line along the longitudinal direction of the display and another row of pixels shifted by a predetermined distance in the longitudinal direction of the display from the first row of pixels. The imaging unit may be disposed at a predetermined distance from the display in the longitudinal direction.

In this configuration, when the three-dimensional shape of an object is detected by triangulation, for instance, the inclination of the path of pattern light projected to the object by the projection unit can be controlled in a half of the pitch of the pixels of the display. Accordingly, the three-dimensional shape can be detected with high precision.

What is claimed is:

1. A projection apparatus comprising:
 a plurality of semiconductor light-emitting elements for emitting light;
 a spatial modulation element that performs spatial modulation of light emitted from the semiconductor light-emitting element and outputs image signal light;
 a light-collecting optical system disposed between the semiconductor light-emitting elements and the spatial modulation element, for collecting light emitted from each of the semiconductor light-emitting elements and individually outputting the collected light from each of the semiconductor light-emitting elements as high-directivity light to the spatial modulation element; and
 a projection unit that projects the image signal light output from the spatial modulation element onto a projection plane,
 wherein the plurality of semiconductor light-emitting elements are arranged on a substrate supporting the semiconductor light-emitting elements, in one or more parallel rows of semiconductor light-emitting elements, each including two or more semiconductor elements arranged in a straight line in a first direction at a first pitch; and
 the first pitch is smaller than or equal to the full width at half maximum of an illumination distribution of light emitted from one of the semiconductor light-emitting elements, formed by the spatial modulation element.

2. The projection apparatus according to claim 1, wherein the plurality of semiconductor light-emitting elements are arranged at a second pitch in two or more parallel rows in a second direction intersecting the one or more parallel rows of semiconductor light-emitting elements; and the second pitch is almost the same as the first pitch.

3. The projection apparatus according to claim 1, wherein the one or more parallel rows of semiconductor light-emitting elements comprise a plurality of rows; and the semiconductor light-emitting elements in two adjacent rows of semiconductor light-emitting elements are arranged in a staggered configuration.

4. The projection apparatus according to claim 1, wherein the plurality of semiconductor light-emitting elements are arranged in parallel rows, alternating between a first row of semiconductor light-emitting elements and another row of semiconductor light-emitting elements shifted in the direction in which the first row of semiconductor light-emitting elements extends by about a half of the first pitch, at a pitch of the first pitch multiplied by about $\sqrt{3}/2$ between the rows.

5. The projection apparatus according to claim 1, further comprising:

an imaging unit that takes an image of an object disposed in the projection direction while image signal light output from the projection unit is projected onto the object as pattern light; and a three-dimensional-shape detection unit that detects the three-dimensional shape of the object in accordance with the image taken by the imaging unit, wherein the spatial modulation element comprises a flat display, and the display comprises a plurality of pixels arranged in a staggered configuration.

6. A three-dimensional-shape detection apparatus comprising:

a projection apparatus according to claim 1;

an imaging unit that takes an image of an object disposed in the projection direction in which the image signal light output from the projection unit in the projection apparatus is projected, while the image signal light is projected from the projection unit onto the object as pattern light; and a three-dimensional-shape detection unit that detects the three-dimensional shape of the object in accordance with the image taken by the imaging unit.

7. A projection apparatus comprising:

a plurality of semiconductor light-emitting elements for emitting light;

a spatial modulation element for performing spatial modulation of light emitted from the semiconductor light-emitting elements and outputs image signal light;

a light-collecting optical system disposed between the semiconductor light-emitting elements and the spatial modulation element, for collecting light emitted from each of the semiconductor light-emitting elements and individually outputting the collected light from each of the semiconductor light-emitting elements to the spatial modulation element; and a projection unit that projects the image signal light output from the spatial modulation element to a projection plane, wherein the plurality of semiconductor light-emitting elements are arranged in a staggered configuration on a substrate supporting the plurality of semiconductor light-emitting elements, and wherein the distance between one of the semiconductor light-emitting elements and semiconductor light-emitting elements surrounding the one of the semiconductor light-emitting elements is smaller than or equal to the full width at half maximum of the illumination distribution of light emitted from one of the semiconductor light-emitting elements, formed by the spatial modulation element.

8. The projection apparatus according to claim 7, wherein the light-collecting optical system comprises a plurality of lens faces integrally formed, in one-to-one correspondence with the plurality of semiconductor light-emitting elements.

9. The projection apparatus according to claim 7, wherein the light-collecting optical system comprises bullet-shaped lenses separately formed to contain the plurality of semiconductor light-emitting elements in one-to-one correspondence.

10. The projection apparatus according to claim 9, further comprising a frame-shaped fixture member for surrounding the plurality of lenses in the light-collecting optical system to bring the lenses into close contact with one another.

11. The projection apparatus according to claim 9, further comprising a flat fixture member having a fixing hole made at a position corresponding to a predetermined position of each lens, for disposing each lens of the light-collecting optical system in the predetermined position.

12. The projection apparatus according to claim 11, wherein the sectional shape of the fixing hole is formed along at least a part of the outer surface of each lens of the light-collecting optical system.

13. The projection apparatus according to claim 7, further comprising an elastic member for coming into contact with an outer surface of the light-collecting optical system.

14. The projection apparatus according to claim 7, wherein the plurality of semiconductor light-emitting elements emit light in the same color.

15. The projection apparatus according to claim 14, wherein the semiconductor light-emitting elements are light-emitting diodes; and the light-emitting diodes emit light in amber.

16. The projection apparatus according to claim 7, wherein the projection unit comprises a plastic lens.

17. The projection apparatus according to claim 7, wherein the projection unit comprises a telecentric lens.

18. The projection apparatus according to claim 7, further comprising:

an imaging unit that takes an image of an object disposed in the projection direction while the image signal light output from the projection unit is projected onto the object as pattern light; and a three-dimensional-shape detection unit that detects the three-dimensional shape of the object in accordance with the image taken by the imaging unit, wherein the spatial modulation element comprises a flat display; and the display comprises a plurality of pixels arranged in a staggered configuration.

19. The projection apparatus according to claim 18, wherein a wide face of the imaging unit and a wide face of the display are disposed almost in the same direction.

20. The projection apparatus according to claim 18, wherein the plurality of pixels forming the display are arranged in parallel rows, alternating between a first row of pixels arranged in a straight line along the longitudinal direction of the display and another row of pixels shifted by a predetermined distance in the longitudinal direction of the display from the first row of pixels; and the imaging unit is disposed at a predetermined distance from the display in the longitudinal direction.

21. A three-dimensional-shape detection apparatus comprising:

a projection apparatus according to claim 7;

an imaging unit that takes an image of an object disposed in the projection direction in which the image signal light output from the projection unit in the projection apparatus is projected, while the image signal light is projected from the projection unit onto the object as pattern light; and a three-dimensional-shape detection unit that detects the three-dimensional shape of the object in accordance the image taken by the imaging unit.

22. The three-dimensional-shape detection apparatus according to claim 21, wherein the spatial modulation element comprises a flat display; the display comprises a plurality of pixels arranged in a staggered configuration; and a wide face of the imaging unit and a wide face of the display are disposed almost in the same direction.

23. The three-dimensional-shape detection apparatus according to claim 21, wherein the plurality of pixels forming the display are arranged in parallel rows, alternating between a first row of pixels arranged in a straight line along the longitudinal direction of the display and another row of pixels shifted by a predetermined distance in the longitudinal direction of the display from the first row of pixels; and the imaging unit is disposed at a predetermined distance from the display in the longitudinal direction.

* * * * *